US012434395B1

(12) United States Patent
Howcroft

(10) Patent No.: US 12,434,395 B1
(45) Date of Patent: Oct. 7, 2025

(54) KNIFE HAVING A HOOK-SHAPED HANDLE TO FACILITATE CARRY AND EASE OF USE

(71) Applicant: Matthew Craig Howcroft, Pleasant Grove, UT (US)

(72) Inventor: Matthew Craig Howcroft, Pleasant Grove, UT (US)

( * ) Notice: Subject to any disclaimer, the term of this patent is extended or adjusted under 35 U.S.C. 154(b) by 338 days.

(21) Appl. No.: 17/586,643

(22) Filed: Jan. 27, 2022

(51) Int. Cl.
*B26B 3/00* (2006.01)
*B25G 1/10* (2006.01)
*B26B 29/02* (2006.01)

(52) U.S. Cl.
CPC ................ *B26B 3/00* (2013.01); *B25G 1/102* (2013.01); *B26B 29/025* (2013.01)

(58) Field of Classification Search
CPC ........ B25G 1/10; B25G 1/102; B26B 3/00–08
USPC ............................................................ 30/312
See application file for complete search history.

(56) References Cited

U.S. PATENT DOCUMENTS 108,141 A * 10/1870 Houseman et al. .... B26B 29/02 30/340
244,252 A * 7/1881 Joyce .................... B26B 27/007 30/298
562,454 A * 6/1896 Browne ............... B43K 23/001 24/11 CT
1,217,154 A * 2/1917 Colvin ...................... B26B 3/00 30/298.4
1,248,852 A * 12/1917 Hemming ................. B26B 5/00 30/157
2,010,074 A * 8/1935 Fuerst .................... A47G 21/10 294/99.2
2,721,340 A * 10/1955 Shultz ....................... B25F 1/00 30/151
2,783,536 A * 3/1957 McQueary ............ B26B 29/025 224/675
2,903,171 A * 9/1959 Rutledge, Jr. ......... B26B 29/025 224/232
2,942,342 A * 6/1960 Warren .................. A47G 21/04 30/327

(Continued)

OTHER PUBLICATIONS

"Marbles Bird/Trout Neck Knife", SMKW, https://www.smkw.com/marbles-bird-trout-knife-formerly-ma-mr80910, downloaded Jan. 13, 2022, 4 pages.

(Continued)

*Primary Examiner* — Adam J Eiseman
*Assistant Examiner* — Richard D Crosby, Jr.

(57) ABSTRACT

In some embodiments of the present disclosure, a knife includes a blade having a cutting edge and a spine opposite the blade. The knife further includes a bolster adjacent to the blade and a handle. The handle includes a first portion extending longitudinally from a first end coupled to the bolster to a second end. The handle includes a second portion extending longitudinally towards the bolster from the second end. The second portion is located on a side of the first portion opposite the cutting edge of the blade. The handle includes a curved portion coupling the first portion and the second portion, forming a butt of the knife. The first portion and second portion form an opening between the first portion and the second portion configured to allow the knife to hang from a side edge of a pocket when the knife is carried within the pocket.

20 Claims, 18 Drawing Sheets

(56) References Cited

U.S. PATENT DOCUMENTS

| | | | | | |
|---|---|---|---|---|---|
| 3,581,326 | A * | 6/1971 | Hayes | B25F 1/00 | 224/232 |
| 3,992,776 | A * | 11/1976 | Koppe | B26B 3/06 | 224/232 |
| 4,013,250 | A * | 3/1977 | McGaffin | A47J 43/287 | 248/37.3 |
| 4,087,911 | A | 5/1978 | Schrock et al. | | |
| 4,283,854 | A * | 8/1981 | Austin | B26B 3/06 | 30/340 |
| 4,546,510 | A * | 10/1985 | Harrison | B26B 23/00 | 30/151 |
| 4,712,304 | A | 12/1987 | Sanelli | | |
| 4,885,818 | A | 12/1989 | Arterbury | | |
| D306,956 | S * | 4/1990 | Kawasaki | D7/649 | |
| 5,033,987 | A | 7/1991 | Bloch | | |
| 5,075,975 | A * | 12/1991 | Wilson | A47G 21/02 | 30/322 |
| 5,113,587 | A | 5/1992 | Loomis | | |
| 5,265,312 | A * | 11/1993 | Okumura | B25F 5/00 | 24/3.12 |
| 5,373,643 | A * | 12/1994 | Warren | A47G 21/02 | 30/340 |
| 5,377,413 | A * | 1/1995 | Masse | B26B 3/00 | 30/162 |
| D368,951 | S * | 4/1996 | Buck | D22/118 | |
| 5,606,772 | A * | 3/1997 | Ilic | A01B 1/00 | 294/58 |
| 5,647,130 | A * | 7/1997 | Collins | B26B 29/025 | 30/162 |
| 6,173,477 | B1 * | 1/2001 | Kikutani | A46B 5/02 | 16/446 |
| 6,460,255 | B1 | 10/2002 | Dassaud | | |
| 6,701,624 | B1 | 3/2004 | White | | |
| D519,798 | S * | 5/2006 | Dallas | D8/20 | |
| D701,443 | S * | 3/2014 | Weigl, Jr. | B25G 1/00 | D8/305 |
| D752,384 | S * | 3/2016 | Fredaeng | D7/401.2 | |
| D768,803 | S * | 10/2016 | Benton | D22/118 | |
| D780,877 | S * | 3/2017 | Goeckel | D22/118 | |
| D807,128 | S * | 1/2018 | Magras | D7/654 | |
| 10,244,856 | B1 * | 4/2019 | Horsky | A45D 24/14 | |
| 10,913,168 | B1 * | 2/2021 | Salvitti | B26B 1/04 | |
| 11,007,657 | B2 | 5/2021 | Dixon | | |
| 11,135,734 | B1 * | 10/2021 | Heumann | B26B 3/00 | |
| 11,207,790 | B2 * | 12/2021 | Buerk | B26B 3/06 | |
| 11,407,129 | B2 * | 8/2022 | Betancourt | B26B 9/00 | |
| 11,723,451 | B1 * | 8/2023 | Boccard | A46B 15/0061 | 132/273 |
| 2007/0051206 | A1 * | 3/2007 | Horton | B25H 3/006 | 81/20 |
| 2008/0110298 | A1 * | 5/2008 | Monk | B67B 7/16 | 81/3.08 |
| 2014/0373862 | A1 * | 12/2014 | Prokop, III | A47G 21/08 | 30/165 |
| 2017/0190059 | A1 * | 7/2017 | Martinez | B26B 13/22 | |
| 2019/0224837 | A1 * | 7/2019 | Hoell, III | B25G 1/102 | |
| 2021/0053243 | A1 * | 2/2021 | Seferi | B26B 29/02 | |

OTHER PUBLICATIONS

"Blacksmith Knife", Drunken Smithy, http://www.drunkensmithy.com/product/blacksmith-knife/, downloaded Jan. 13, 2022, 5 pages.

* cited by examiner

FIG. 11A
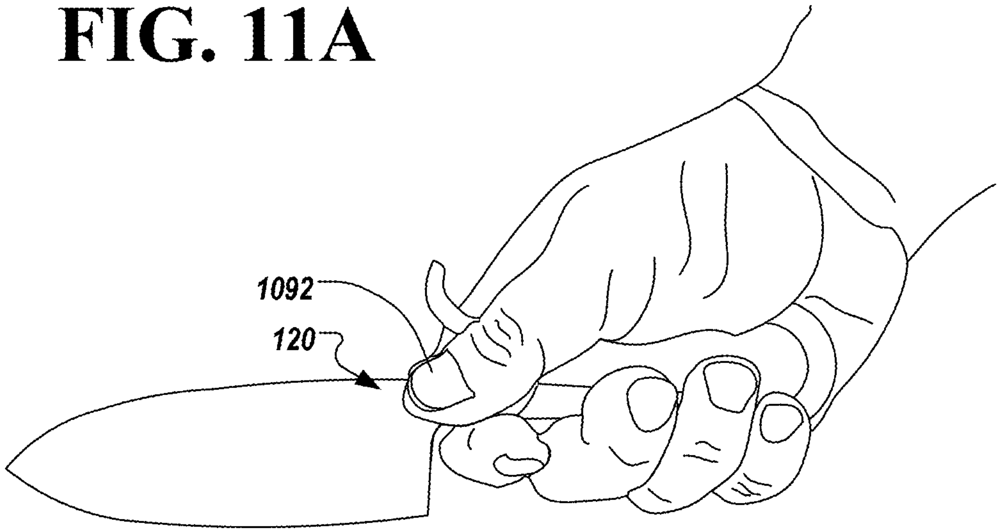
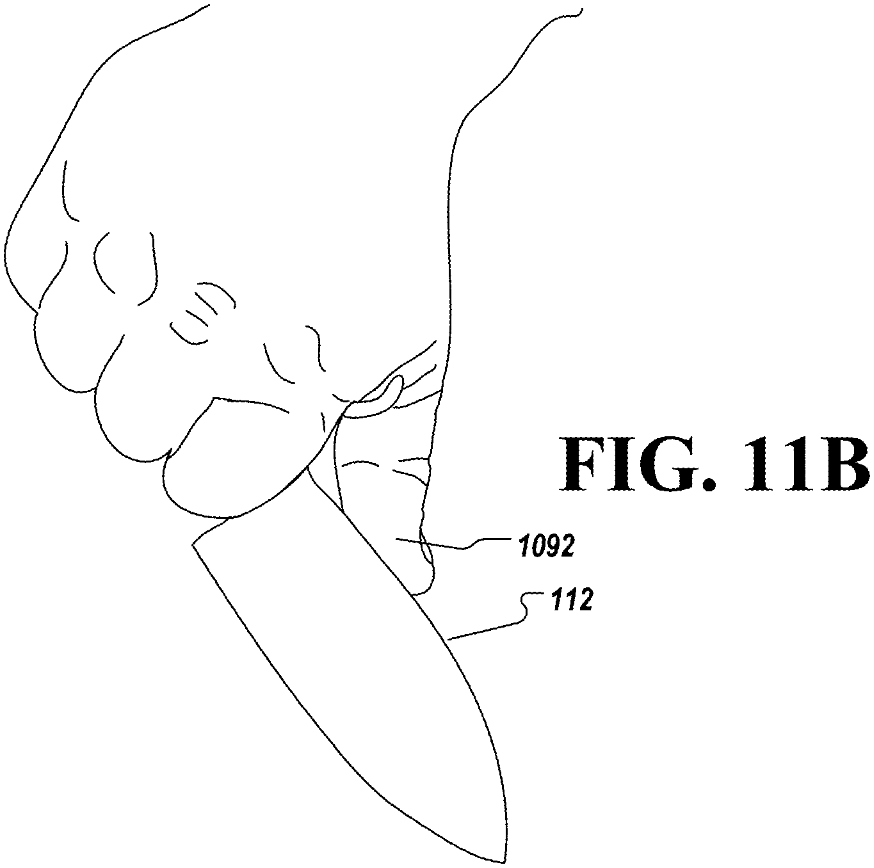
FIG. 11B

KNIFE HAVING A HOOK-SHAPED HANDLE TO FACILITATE CARRY AND EASE OF USE

TECHNICAL FIELD

Embodiments of the present disclosure relate to a knife having a hook-shaped handle to facilitate carry in a pocket and ease of use. The knife can be for hunting or any other general-purpose use.

BACKGROUND

Knife users often seek convenient ways of carrying a knife. A knife can be carried in a sheath attached to the user's belt, but situations regularly occur where the user desires to carry the knife at least somewhat concealed. To conceal a knife, a person may place the knife in a pocket. While carried in a pocket, the knife can fall deep into the pocket, causing difficulty drawing the knife.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some embodiments, a knife includes a blade having a cutting edge and a spine opposite the cutting edge. The knife further includes a bolster adjacent to the blade. The knife further includes a handle. The handle includes a first portion extending longitudinally from a first end coupled to the bolster to a second end. The handle further includes a second portion extending longitudinally towards the bolster from the second end to a third end. The second portion is located on a side of the first portion opposite the cutting edge of the blade. The handle further includes a curved portion coupling the first portion and the second portion. The curved portion forms a butt of the knife. The first portion and second portion form an opening between the first portion and the second portion. The opening is configured to allow the knife to hang from a side edge of a pocket when the knife is carried within the pocket.

In some embodiments, a cutting system includes the knife as described in this disclosure. The cutting system further includes a sheath configured to hold the knife. The sheath includes a cavity to receive the blade of the knife. A body of the sheath has a first end and a second end. The body forms an opening at the first end for the blade to enter the cavity.

In some embodiments, a cutting apparatus includes a blade and a handle. The handle includes an extension that extends from a first end of the handle towards a second end proximate to the blade on a same side as a spine of the blade. The handle and the extension form an opening between the extension and the handle at the second end.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

FIGS. 11A-B illustrate a user's hand gripping a knife in a natural grip, according to certain embodiments.

DETAILED DESCRIPTION

Figure 1:
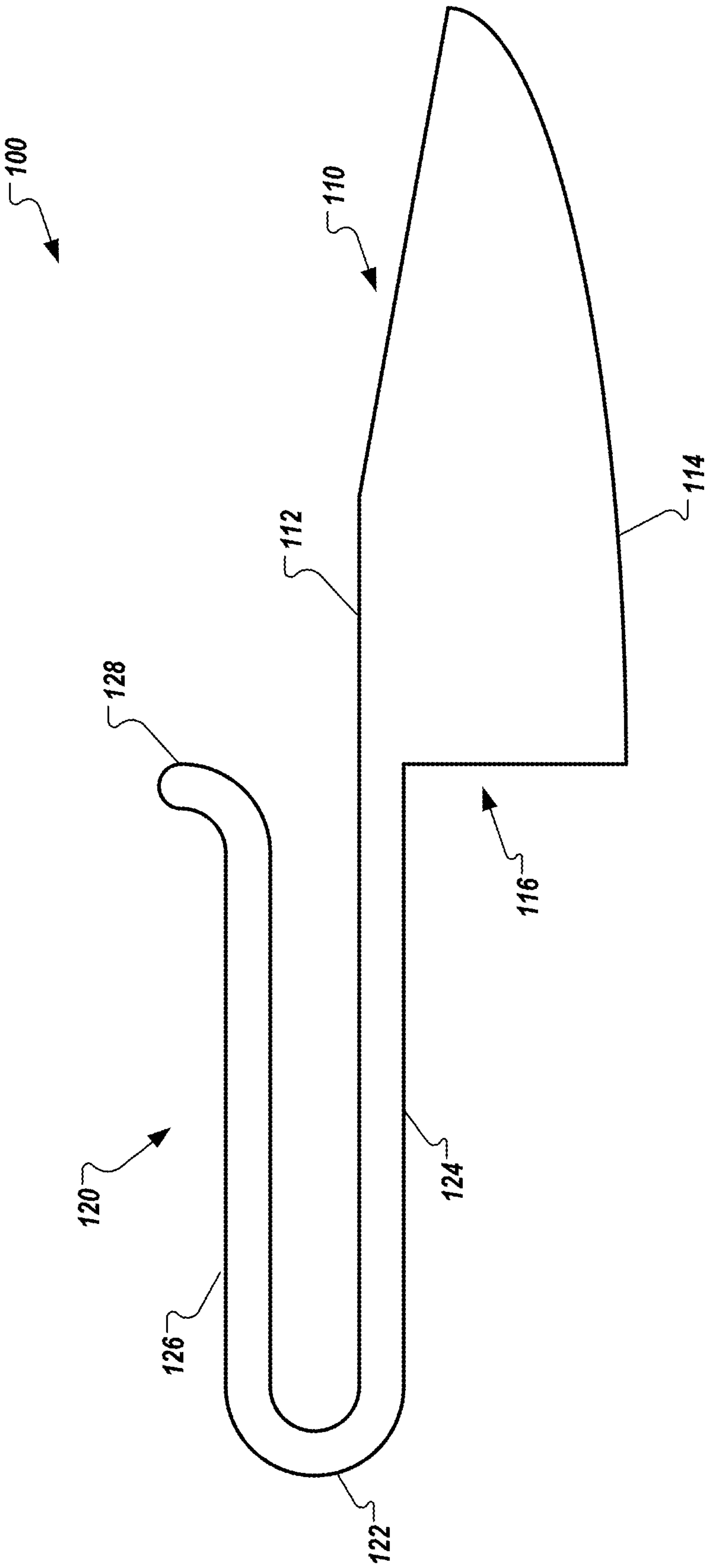
FIG. 1 is a schematic diagram illustrating a wireframe side view of a knife, according to certain embodiments.

Embodiments described herein are related to a knife having a substantially hook-shaped handle to facilitate carry and ease of use.

Knives are often carried by their users while not in use. Typically, fixed-blade knives are carried in a sheath. The sheath guards against accidental or unwanted contact with the knife's cutting edge such that the knife can be safely carried. The sheath is often fastened to the user's belt. Often, a user may wish to conceal the knife. Concealing a knife carried in a sheath fastened to a belt can be difficult and may require the carrier to wear a cover garment such as a long shirt, a jacket, or a coat. Instead of carrying a fixed-blade knife, a user that wishes to conceal a knife may elect to carry a folding knife. A folding knife can be safely carried in a pocket, often a pants pocket. The cutting edge of a folding knife is guarded by the knife's handle when the knife is folded. A user may wish to safely carry a fixed-blade knife in a pocket.

To safely carry a fixed-blade knife in a pocket, the knife is commonly carried in a sheath. However, the knife and sheath can fall deep into the pocket, hindering access to the knife and potentially causing hang-ups when withdrawing the knife from the sheath. Additionally, a knife carried in a sheath within a pocket may be difficult to withdraw. A knife and sheath constructed in such a manner that the knife can be conveniently carried in a pocket and easily drawn from the pocket may be advantageous.

Additionally, while using a knife, a user may wish, at times, to temporarily use their fingers to manipulate an item without setting the knife down. Sometimes, lanyards are used to attach a knife to the user's wrist. However, using a lanyard in such a manner can be dangerous because the knife may swing uncontrolled while suspended by the lanyard. A knife that can be temporarily suspended by the user while allowing the user to exercise an amount of control over the knife may be advantageous and safer.

Described herein is a knife having a substantially hook-shaped handle to facilitate carry and ease of use. The knife of the present disclosure is a fixed-blade knife. The knife includes a blade and a handle. Additionally, the knife includes a bolster adjacent to the blade, between the blade and the handle. In some embodiments, the handle is attached to the bolster. The blade includes a cutting edge and a spine opposite the cutting edge. The cutting edge may be sharpened such that the cutting edge can be used to cut. The spine may be blunt. The hook-shaped handle is configured for the user to hold while manipulating the knife. The user may grasp the knife by the handle. In some embodiments, the knife can be hung by the handle, both while the knife is carried and while the knife is temporarily disused. Additionally, in some embodiments, the blade and handle are configured for the user to use a variety of gripping techniques (e.g., natural grip, ice pick grip, pull cut grip, pinch grip, hammer grip, etc.) while using the knife.

The handle includes a first portion extending longitudinally (i.e., lengthwise) from a first end coupled to the bolster. The first portion may extend from the bolster in a direction substantially parallel to the spine where the spine meets the bolster. The first portion extends from the bolster to a butt of the knife. The knife's butt may comprise a second end. The handle includes a second portion extending longitudinally from the butt towards the bolster. The second portion may extend from the second end (i.e., the butt) to a third end. The second portion is located on a side of the first portion opposite the cutting edge. In some embodiments, the first portion and the second portion are approximately (e.g., substantially) parallel. In some embodiments, the first portion and the second portion are curved. In some embodiments, the first portion and the second portion are non-parallel, but are configured to be grasped by a user's hand (e.g., see FIG. 4). A curved portion of the handle connects the first portion and the second portion. The curved portion forms the butt of the knife. The first portion and second portion form an opening. The opening may be disposed between the first portion and the second portion. In some embodiments, the opening is substantially "U" shaped. In some embodiments, the opening is configured to allow the knife to hang from a side edge of a pocket when the knife is carried within the pocket. In some embodiments, the first, second, and curved portions of the handle form a substantially hooked shape handle. Additionally, the knife can be hung from a finger of the user's hand by the curved portion of the handle.

The knife of the present disclosure may be carried in a sheath. The sheath may include a body having a first end and a second end. The sheath may have a protrusion at the second end. The protrusion may be integrated into the body of the sheath. When the sheath is carried in a pocket, the protrusion may catch onto an inner part of the pocket while the knife is withdrawn, allowing the knife to exit the sheath. Additionally, the sheath may include one or more flanges at the first end. The one or more flanges may be integrated into the body of the sheath. The one or more flanges may hang on an edge of the pocket while the knife is inserted into the sheath, allowing the knife to enter the sheath without the sheath being pushed into the pocket until the knife is fully inserted.

The knife of the present disclosure provides advantages over conventional knives. For example, a knife of the present disclosure can be safely and conveniently carried in a sheath in a pocket. The knife of the present disclosure can be hung on the side (e.g., side edge) of a pocket while the knife is carried in a sheath in the pocket. Additionally, the flanges of the sheath associated with the knife of the present disclosure stop the sheath from falling and/or being pushed deep into the pocket, allowing for the knife to be easily withdrawn and replaced. Further, a protrusion of the sheath allows the knife to be withdrawn from the sheath without the sheath being extracted from the pocket. Additionally, the knife of the present disclosure can be temporarily hung by a finger of the user's hand while the user manipulates an object, unlike conventional knives. These features combine to provide a knife and associated sheath with advantages in use and carry over conventional knives.

FIG. 1 is a schematic diagram illustrating a wireframe side view of a knife, according to certain embodiments. A knife 100 includes blade 110 (e.g., blade portion) and handle 120 (e.g., handle portion). Additionally, knife 100 includes bolster 116 (e.g., bolster portion). Blade 110 includes a spine 112 and a cutting edge 114. Spine 112 is opposite cutting edge 114. In some embodiments, blade 110 has a drop point shape. In other embodiments, blade 110 has an alternative blade shape such as clip point shape, sheepsfoot shape, straight back shape, hunter shape, bowie shape, gut shape, tanto shape, reverse tanto shape, cleaver shape, hawksbill shape, etc. In yet more embodiments, blade 110 has a skinner shape, a spear point shape, a caping shape, a spey shape, a coping shape, a pen knife shape, a whamcliffe shape, or a straight razor shape. In some embodiments, cutting edge 114 extends from a heel of the blade (e.g., adjacent to bolster 116) to a point of the blade. In some embodiments, at least a portion of cutting edge 114 is serrated (e.g., see FIG. 5). In some embodiments, spine 112 extends from the bolster 116 to the point of the blade. In some embodiments, bolster 116 forms a junction between the handle 120 and the blade 110. In some embodiments, bolster 116 is thicker than blade 110. In some embodiments, bolster 116 provides a smooth transition between blade 110 and handle 120.

Blade 110 has a thickness. In some embodiments, the thickness of blade 110 is non-uniform. In some embodiments, the thickness of blade 110 at cutting edge 114 is substantially thinner than at spine 112. In some embodiments, bolster 116 has a thickness. Bolster 116 may have a thickness similar to spine 112. Bolster 116 may be markedly thicker than blade 110. In some embodiments, bolster 116 has a non-uniform thickness. In some embodiments, bolster 116 is thinner at locations proximate cutting edge 114 than locations proximate spine 112. In some embodiments, blade 110 is coated with a coating material. Blade 110 may be coated with a titanium nitride coating, a paint coating, an epoxy coating, a powder coating, a physical vapor deposition (PVD) coating, a thin-film ceramic coating, a diamond-like carbon (DLC) coating, a tungsten carbide coating, and/or a chromium nitride coating.

Figure 4:
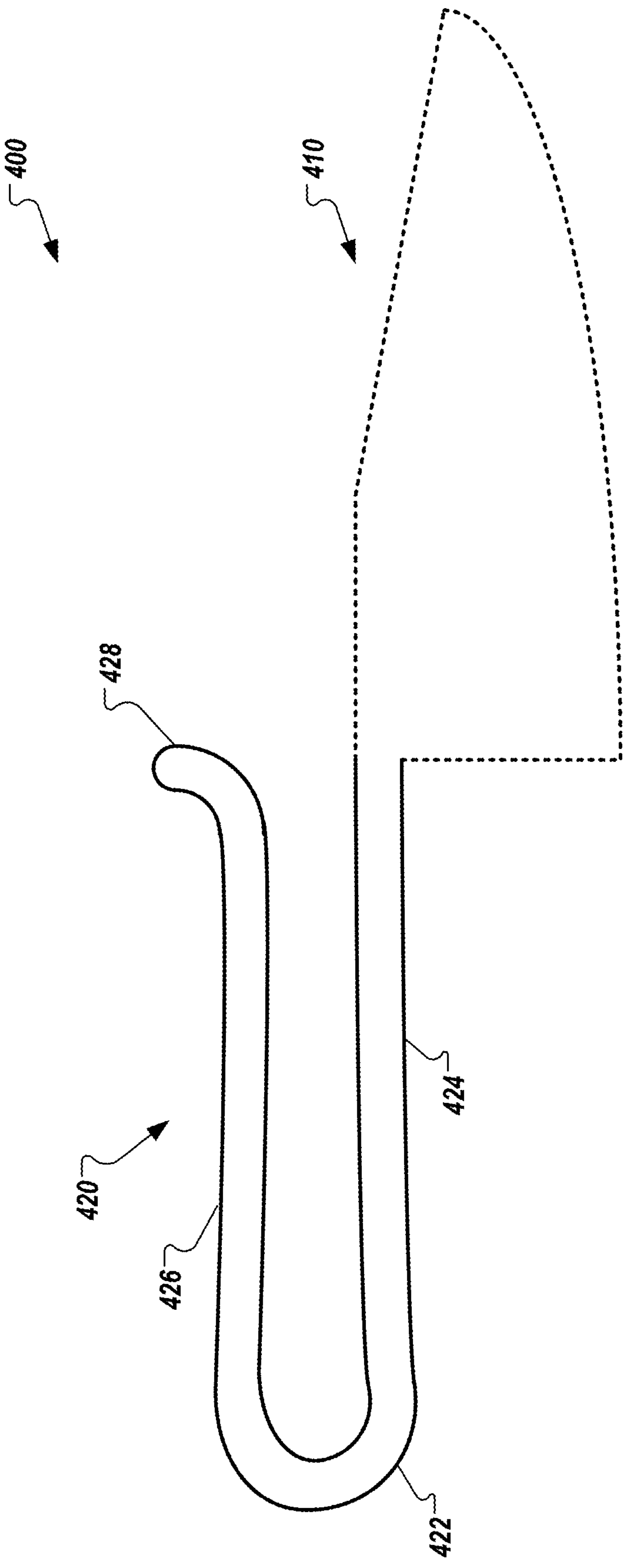
FIG. 4 is a schematic diagram illustrating a wireframe side view of a knife, according to certain embodiments.

Handle 120 includes first portion 124, second portion 126, and butt 122. First portion 124 extends longitudinally away from blade 110 from a first end coupled to bolster 116 to a second end (e.g., butt 122). Second portion 126 extends longitudinally towards blade 110 from the second end (e.g., butt 122) to a third end proximate to bolster 116. Butt 122 makes up a curved portion coupling the first portion 124 and the second portion 126. In some embodiments, first portion 124 and second portion 126 have substantially similar lengths. Additionally, first portion 124, second portion 126, and butt 122 together may form a substantially hooked shape handle. In some embodiments, first portion 124, second portion 126, and butt 122 together may form a substantially "U"-ed shape handle. The "U" shape may be a substantially hooked shape. In some embodiments, first portion 124 and second portion 126 are substantially parallel to one another. In some embodiments, first portion 124 and second portion 126 are approximately parallel to one another. In some embodiments, first portion 124 and second portion 126 are neither substantially nor approximately parallel to one another, but are nonetheless configured such that first portion 124, second portion 126, and butt 122 can be gripped by a user's hand and form a substantially hooked shape handle (e.g., see FIG. 4). In some embodiments, first portion 124 and second portion 126 are curved to fit a user's hand. In some embodiments, an inner radius of butt 122 may be wider than at least a portion of the opening between the first portion 124 and the second portion 126 to fit a user's finger. A knife having a curved handle and a butt with a widened inner radius is shown in FIG. 4. In some embodiments, handle 120 and blade 110 have substantially similar lengths. Providing handle 120 and blade 110 with substantially similar lengths may allow knife 100 to be more conveniently carried in a pocket, especially a pants pocket. In some embodiments, blade 110 is substantially shorter than handle 120. In some embodiments, blade 110 has a length of two inches or less. Handle 120 may be approximately four inches long regardless of blade length. In some embodiments, handle 120 may have a length ranging from approximately 3 inches to 4.5 inches. In some embodiments, handle 120 has a longer length (e.g., approximately 4.5 inches) to accommodate a user with larger hands. In some embodiments, handle 120 has a shorter length (e.g., approximately 3 inches) to accommodate a user with smaller hands. In some embodiments, first portion 124 and second portion 126 form an opening between them. The opening may be substantially "U" shaped. The opening may have a mouth adjacent to the spine 112. The opening may be configured to allow the knife to hang from a side edge of a pocket when knife 100 is carried within the pocket. For example, when knife 100 is inserted into a pocket, the side edge of the pocket may slip into the opening between first portion 124 and second portion 126, supporting knife 100 by an inner radius of butt 122. A pocket may include a pocket of clothing (e.g., a pants pocket, a jacket or coat pocket, and/or a shirt pocket, etc.). Additionally, a pocket may include a pocket of a bag, a purse, a satchel, a piece of luggage, a backpack, etc. A pocket may be any receptacle into which the knife and its sheath may be inserted.

In some embodiments, handle 120 forms an opening between first portion 124 and second portion 126. In some embodiments, first portion 124 and second portion 126 are substantially parallel and form an opening. The opening may be substantially "U" shaped. In some embodiments, the opening is to receive a side of a pocket (e.g., a side edge of a pocket of clothing). In some embodiments, the first portion 124 and the second portion 126 form a channel to accept a side of a pocket. In some embodiments, knife 100 is to be hung from handle 120 by a side of a pocket while knife 100 is carried in the pocket. In some embodiments, the opening is adjacent to bolster 116. In some embodiments, the opening is configured to allow the knife 100 to hang from the side of a pocket when the knife 100 is carried within the pocket. In some embodiments, the knife 100 is supported by an inner radius of butt 122 while carried in the pocket. For example, knife 100 can be inserted into a pants pocket, the bulk of the knife (e.g., blade 110, bolster 116, first portion 124, and at least a portion of butt 122) disposed in the pocket, while second portion 126 and a portion of butt 122 remain outside the pocket, the knife 100 hanging by the edge of the pocket by an inner radius of butt 122.

Additionally, the inner radius of butt 122 may be configured to accept a finger of a user's hand. In some embodiments, knife 100 can be hung by butt 122 on a finger (e.g., of a user's hand) while the user manipulates another object and/or completes another task. In some embodiments, knife 100 is configured such that a user does not need to set knife 100 down or insert knife 100 into a sheath while temporarily disusing knife 100. For example, while holding knife 100, a user can insert a finger (e.g., a pinky finger) through the inner radius of butt 122, causing knife 100 to hang from the finger by the inner radius of butt 122, allowing the user to use their other fingers to perform a task or manipulate an object. The user may maintain at least a degree of control over the knife when the knife is hung by a finger in this manner.

In some embodiments, butt 122 curves in a direction away from the cutting edge 114 such that the second portion 126 is located on a side of the first portion 124 opposite the cutting edge. The direction may be a first direction. In some embodiments, butt 122 curves in a direction away from the cutting edge 114 such that the opening formed by first portion 124 and second portion 126 is disposed adjacent to spine 112. Disposing the opening adjacent spine 112 allows knife 100 to be safely inserted into or drawn from a pocket (e.g., cutting edge 114 may not contact the edge of the pocket on which knife 100 is to be hung and which may slide into the opening between the first portion 124 and the second portion 126).

In some embodiments, second portion 126 includes guard 128 at the third end (e.g., the terminus of second portion 126 proximate bolster 116). In some embodiments, guard 128 is a curved guard structure. In some embodiments, guard 128 is to prevent a user's hand from slipping off handle 120 while gripping the handle. In some embodiments, guard 128 curves in a direction away from spine 112. Guard 128 may curve in the first direction. In some embodiments, guard 128 guides a side of a pocket into the opening formed by the first portion 124 and the second portion 126.

Handle 120 has a thickness. In some embodiments, handle 120 has a substantially uniform thickness. In some embodiments, the thickness of handle 120 is substantially similar to the thickness of bolster 116 at a location proximate to spine 112.

In some embodiments, knife 100 is made from a single piece of material. In some embodiments, knife 100 is forged. In some embodiments, knife 100 is hammer-forged by hand. Knife 100 may be drop forged. In some embodiments, knife 100 may be made using a computer numerical control (CNC) process, including a CNC laser process, a CNC waterjet process, a CNC plasma-cutting process, or a CNC milling process. In some embodiments, knife 100 may be made by casting. In alternative embodiments, knife 100 may be made by three-dimensional (3D) printing. In some embodiments, blade 110, bolster 116, and handle 120 are forged from a single piece of material. For example, blade 110, bolster 116, and handle 120 may be forged from a single piece of steel. Knife 100 may be made from high-carbon steel. Knife 100 may be made from a stainless steel alloy. In some embodiments, knife 100 is made of stainless steel alloys M390, CTS-204P, or CPM-20CV. In alternative embodiments, knife 100 is made of stainless steel alloys CPM-S30V, CPM-S35VN, or LC200N. Knife 100 can be made of a material that has a balance of desirable characteristics (e.g., edge retention, toughness, corrosion resistance, ease of sharpening, etc.). In some embodiments, knife 100 is made of a steel alloy. In some embodiments, knife 100 is made of a cobalt alloy. In some embodiments, at least a portion of knife 100 is coated with a coating material. At least a portion of knife 100 may be coated with a titanium nitride coating, a paint coating, an epoxy coating, a powder coating, a physical vapor deposition (PVD) coating, a thin-film ceramic coating, a diamond-like carbon (DLC) coating, a tungsten carbide coating, and/or a chromium nitride coating. In some embodiments, blade 110, bolster 116, and handle 120 are a single piece. A tang of knife 100 may form handle 120. Knife 100 may not include scales covering the tang. In some embodiments, a tang of knife 100 is a full tang. In other embodiments, a tang of knife 100 is a half tang or a partial tang. In some embodiments, a tang of knife 100 is at least partially covered (e.g., by scales, a covering, or a coating). In some embodiments, handle 120 may be at least partially covered by a coating material (e.g., a rubberized coating, an anodized coating, etc.). In some embodiments, handle 120 may include scales (e.g., coverings) that aid in a user gripping handle 120. Scales may be made of a scales material, such as a plastic material, a resin material, a wood material, and/or a laminate material. In some embodiments, handle 120 may be wrapped with a rope material (e.g., nylon rope, polyester rope, etc.), such as parachute cord. In some embodiments, handle 120 is welded to bolster 116 by a welding process (e.g., gas metal arc welding, gas tungsten arc welding, shielded metal arc welding, flux-cored arc welding, etc.).

In some embodiments, a cutting apparatus may incorporate features of knife 100. For example, a cutting apparatus (e.g., such as scissors, shears, die cutters, a utility knife, a pocket knife, a hand-held cutting instrument, etc.) may include a blade and a handle. The handle of the cutting apparatus may include a first portion (e.g., first portion 124) and a second portion (e.g., second portion 126) coupled by a curved portion (e.g., butt 122). The first, second, and curved portions together may form a substantially hooked shape handle.

Figure 2:
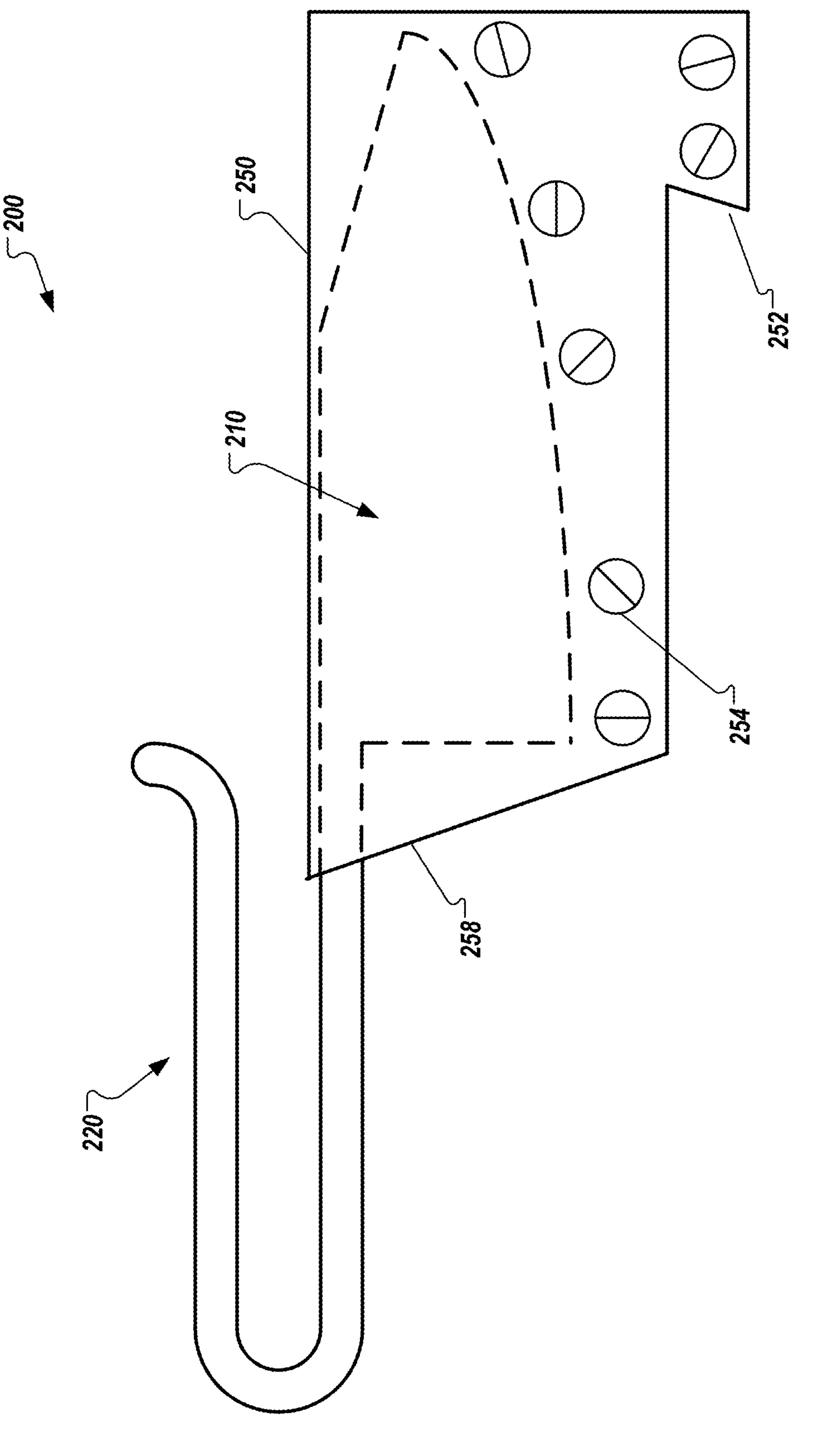
FIG. 2 is a schematic diagram illustrating a partial cut-away wireframe side view of a knife and sheath, according to certain embodiments.

FIG. 2 is a schematic diagram illustrating a partial cutaway wireframe side view of a knife and sheath, according to certain embodiments. A cutting system 200 includes a knife (e.g., knife 100 of FIG. 1) having a handle 220 (e.g., handle 120 of FIG. 1) and a blade 210 (e.g., blade 110 of FIG. 1). Additionally, cutting system 200 includes sheath 250. Sheath 250 may be configured to hold the knife safely. In some embodiments, sheath 250 holds the knife while both the sheath 250 and the knife are carried within a pocket (e.g., a pants pocket, another pocket of clothing, or a bag pocket, etc.). In some embodiments, sheath 250 holds the knife in a pocket with the tip of the knife pointed towards a bottom of the pocket. In some embodiments, sheath 250 holds the knife in the pocket with the knife pointed towards a closed end of the pocket. In some embodiments, sheath 250 tightly holds the knife. In some embodiments, sheath 250 includes a cavity to receive and hold the knife's blade. The cavity may be made up of a first side and a second side of sheath 250. In some embodiments, sheath 250 has a body having a first end and a second end, a first side and a second side of the body forming the cavity. In some embodiments, the body of sheath 250 forms an opening (e.g., sheath mouth 258) at the first end for the blade to enter the cavity. The first and second side may additionally form the opening at the first end. In some embodiments, sheath mouth 258 includes one or more flanges on one or more sides of the body of sheath 250 (e.g., sheath flanges 256, see FIGS. 3A and 3B). In some embodiments, sheath 250 includes protrusion 252. Protrusion 252 may be integrated into the body of sheath 250. In some embodiments, protrusion 252 is a protrusion of the body of sheath 250 disposed proximate the second end of sheath 250. In some embodiments, protrusion 252 is to secure sheath 250 in a pocket (e.g., of clothing, such as a pants pocket) when the knife is withdrawn from the sheath. For example, when sheath 250 is carried within a pocket, protrusion 252 may catch on an interior surface of the pocket (e.g., a pocket liner) when the knife is withdrawn from sheath 250. Protrusion 252 may catch an inner surface of the pocket that sheath 250 is carried in when the knife is pulled from sheath 250.

In some embodiments, sheath 250 is made of a thermoplastic material. In some embodiments, sheath 250 is made of a thermoformed material. Sheath 250 may be made of a thermoplastic material. In some embodiments, sheath 250 is made of a thermoplastic acrylic-polyvinyl chloride material. Particularly, sheath 250 may be made of the KYDEX® thermoplastic, developed by SEKISUI KYDEX, LLC of Bloomsburg, PA. In some embodiments, sheath 250 is made of a thermoplastic sheet, formed to the shape of the knife. The thermoplastic sheet may be thermoformed to the shape of the knife. In some embodiments, sheath 250 is thermoformed from a single sheet of thermoplastic material. The single sheet of thermoplastic material may be folded on itself with the fold being disposed proximate to an edge of the body of sheath 250 where a spine of the blade of the knife is to be held. In some embodiments, sheath 250 includes multiple sheath screws 254 to secure the folded thermoplastic sheet. In some embodiments, the fold of the folded thermoplastic sheet and the multiple sheath screws 254 form boundaries of the cavity of sheath 250. In some embodiments, sheath screws 254 are threaded fasteners. In some embodiments, sheath screws 254 are rivets. In some embodiments, sheath screws 254 include threaded fasteners and corresponding threaded nuts.

In some embodiments, the body of sheath 250 is made of leather. In some embodiments, the body of sheath 250 includes a sub-frame (e.g., thermoplastic material body or other plastic body or frame, etc.) at least partially covered in leather. In some embodiments, sheath 250 includes a side clip (e.g., a side hook, a clip, etc.) to hook onto a side edge of a pocket (e.g., of clothing).

Figure 3A:
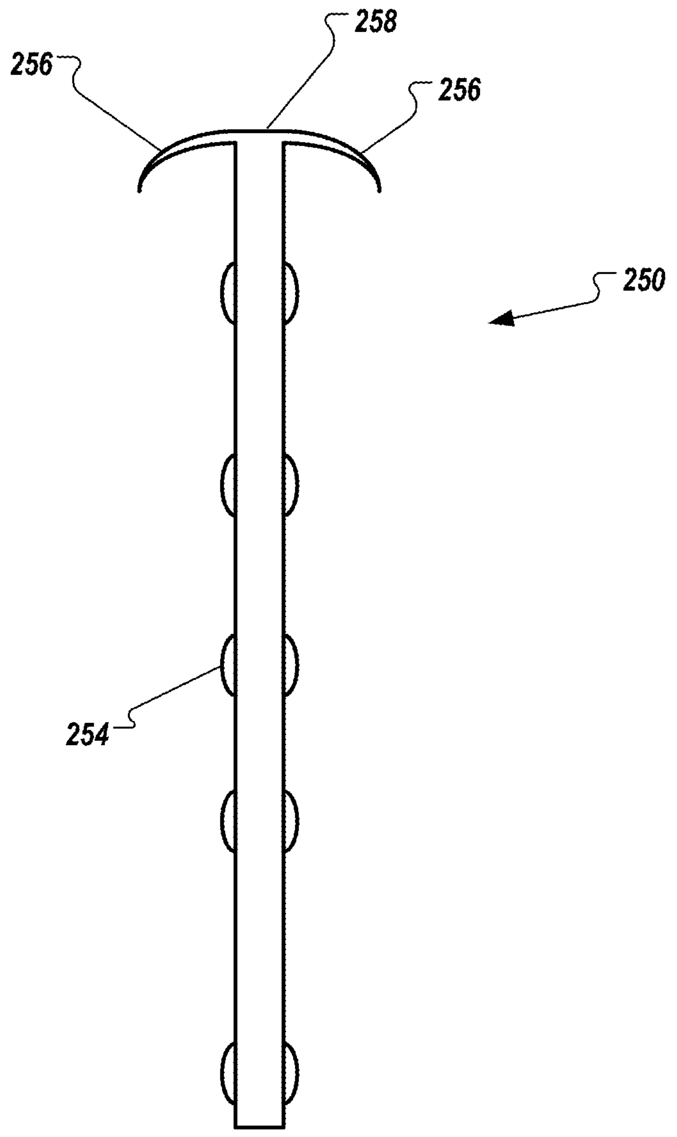
FIG. 3A is a schematic diagram illustrating a wireframe view of a sheath, according to certain embodiments.
Figure 3B:
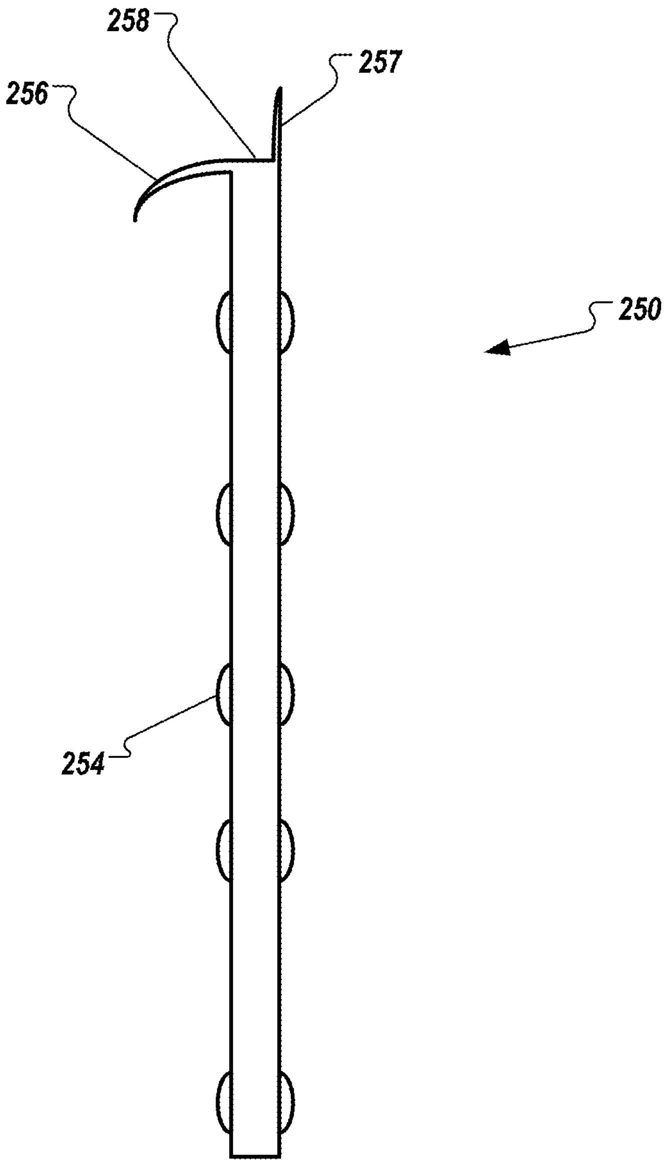
FIG. 3B is a schematic diagram illustrating a wireframe view of a sheath, according to certain embodiments.

FIG. 3A is a schematic diagram illustrating a wireframe view of a sheath, according to certain embodiments. FIG. 3A shows sheath 250 oriented as sheath 250 would be positioned in a pocket of clothing (e.g., in a pants pocket with the tip of the knife pointed down). Sheath 250 may be oriented in a similar manner in another pocket (e.g., a bag pocket, etc.) or any other receptacle to receive sheath 250. In some embodiments, sheath 250 includes one or more flanges (e.g., sheath flanges 256) on either side of sheath mouth 258. In some embodiments, sheath 250 includes two flanges, one on each side of sheath mouth 258. In some embodiments, sheath 250 includes one flange on one side of sheath mouth 258, as shown in FIG. 3B. In some embodiments, one of the flanges 256 may be angled upwards. The side of sheath mouth 258 where the sheath flange 256 is located depends on the user's handedness (e.g., left-handed or right-handed), or how the user prefers to carry the knife. For example, a right-handed user may prefer to carry the knife in a right-side pocket (e.g., a right-side pants pocket), in which case the sheath may have only one flange to engage the side edge of the pocket (e.g., on the right side as viewed by the user looking down at the sheath in a pants pocket) (see FIG. 3B).

In some embodiments, sheath flanges 256 aid in guiding the blade of the knife into sheath mouth 258 as the knife is inserted into sheath 250. In some embodiments, sheath flanges 256 are funnel-shaped. In some embodiments, at least one of sheath flanges 256 are configured to catch on and be supported by an edge of a pocket (e.g., an edge of a pants pocket) while the knife is inserted into sheath 250. For example, when a user inserts sheath 250 into a pocket, one of the sheath flanges 256 may catch on the edge of the pocket (e.g., a top/side edge of a pants pocket), and the edge of the pocket may support sheath 250 by the sheath flange 256, preventing sheath 250 from being pushed into the pocket by the motion and force of inserting the knife into sheath 250.

FIG. 3B is a schematic diagram illustrating a wireframe view of a sheath, according to certain embodiments. FIG. 3B shows sheath 250 oriented as sheath 250 would be positioned in a pocket of clothing (e.g., in a pants pocket with the tip of the knife pointed down). Sheath 250 may be oriented in a similar manner in another pocket (e.g., a bag pocket, etc.) or any other receptacle to receive sheath 250. In some embodiments, sheath 250 includes one flange 256. The side of sheath mouth 258 where the sheath flange 256 is located depends on the user's handedness, or how the user prefers to carry the knife. For example, a right-handed user may prefer to carry the knife in a right-side pocket (e.g., a right-side pants pocket), in which case the flange 256 may be located on a right side of sheath mouth 258 (e.g., as viewed by the user looking down at the sheath in a pants pocket) to engage the side edge of the pocket. In some embodiments, sheath 250 may include an extension 257 at sheath mouth 258 opposite sheath flange 256. Extension 257 may be an extension of the sheath body to aid in re-sheathing a knife. Particularly, extension 257 may aid in blind re-sheathing of a knife.

To re-sheath (i.e., insert) a knife into sheath 250, a user may drag the blade's spine against extension 257 until the user senses sheath mouth 258 is below the tip of the knife. The user may then insert the knife into a cavity of sheath 250 through sheath mouth 258. In some embodiments, after inserting the knife into the sheath, the user may rotate the knife and sheath approximately an eighth of a turn counter-clockwise (if the sheath is worn in the right-hand pocket, as viewed by the user looking down at the sheath) to release sheath flange 256 from an edge of the pocket (e.g., an edge of a pocket of clothing) in which sheath 250 may sit. Releasing sheath flange 256 from the edge of the pocket may allow the sheath and knife to be inserted into the pocket.

To unsheathe (i.e., draw) the knife, the user may pull the knife and sheath out of the pocket by a portion of the handle outside the pocket until sheath flange 256 clears the edge of the pocket. The user may turn the knife and sheath 250 approximately an eighth of a turn clockwise (if the sheath is worn in the right-hand pocket, as viewed by the user looking down at the sheath). Turning the knife and sheath 250 may hook an inside surface of the pocket (e.g., a pocket liner) with protrusion 252 (i.e., of FIG. 2), allowing the removal of the knife from sheath 250 while leaving sheath 250 in the pocket, with flange 256 resting on an upper edge of the pocket.

FIG. 4 is a schematic diagram illustrating a wireframe side view of a knife, according to certain embodiments. FIG. 4 illustrates a knife 400, similar to knife 100 of FIG. 1. Features of FIG. 4 that share similar numbering to features of FIG. 1 may have similar characteristics and may share similar functions. In some embodiments, knife 400 includes a handle 420. Handle 420 may include a first portion 424, a second portion 426, and a butt 422. First portion 424 and second portion 426 may be curved. First portion 424 and second portion 426 may be curved in a plane of blade 410. In some embodiments, first portion 424 and second portion 426 are curved such that first portion 424 and second portion 426 are closer at a location proximate the bolster than a location proximate the butt 422. The curve of first portion 424 and second portion 426 may be designed to fit a grip of a user's hand (e.g., the curve is such that the user can grip the handle 420). An inner radius of butt 422 may be enlarged relative to the opening between first portion 424 and second portion 426 to accept a finger of a user's hand. In some embodiments, first portion 424 and second portion 426 may be curved outward (e.g., forming an opening which is wider at a location proximate butt 422) as shown in FIG. 4. In some embodiments, first portion 424 and second portion 426 are curved in parallel (e.g., forming a curved opening with a uniform width).

Figure 5:
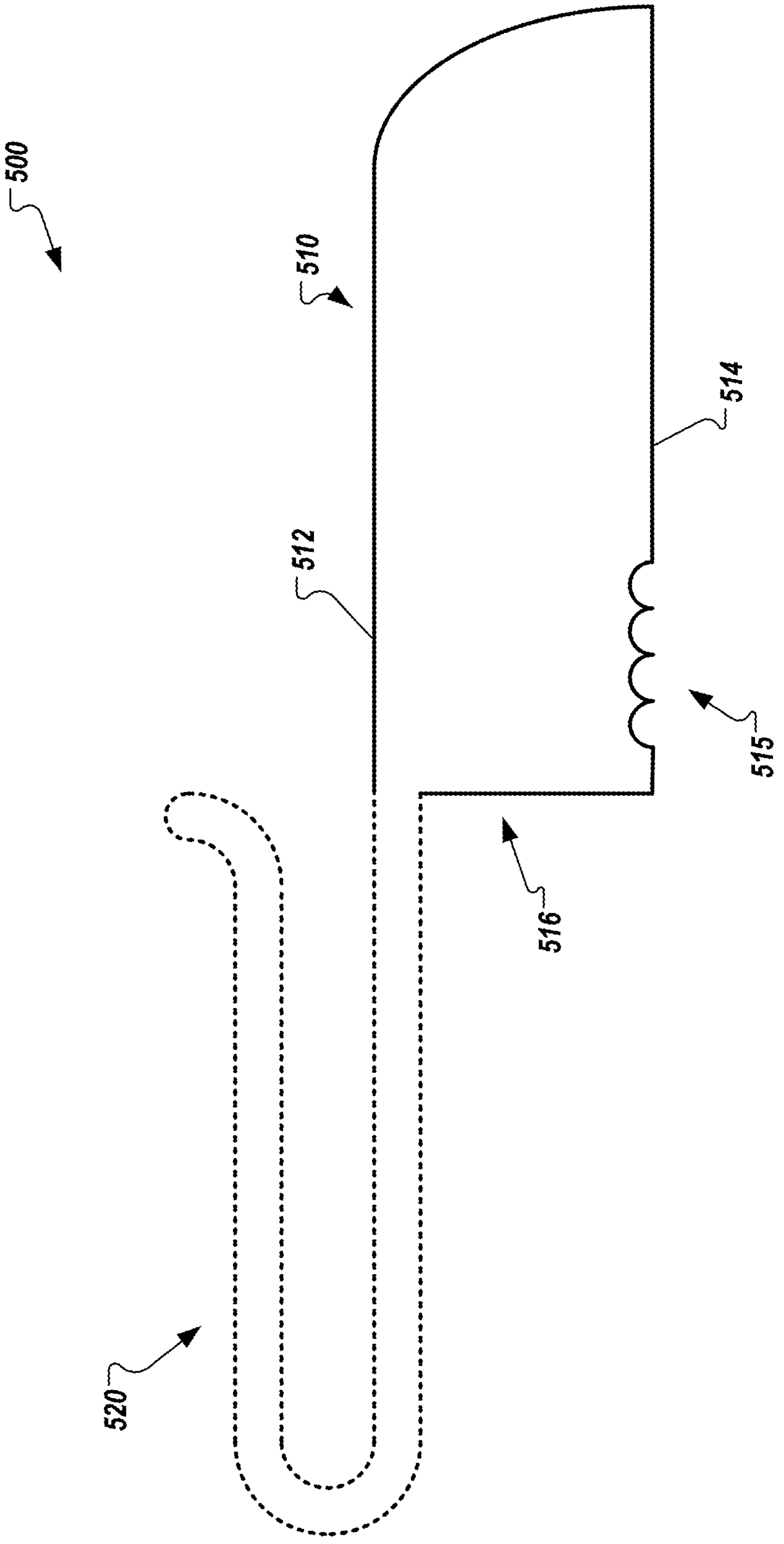
FIG. 5 is a schematic diagram illustrating a wireframe side view of a knife, according to certain embodiments.

FIG. 5 is a schematic diagram illustrating a wireframe side view of a knife 500, according to certain embodiments. FIG. 5 illustrates a knife 500, similar to knife 100 of FIG. 1. Features of FIG. 5 that share similar numbering to features of FIG. 1 may have similar characteristics and may share similar functions. In some embodiments, blade 510 may have a sheepsfoot shape, as shown in FIG. 5. In alternative embodiments, blade 510 may have a clip point shape, a drop point shape, a straight back shape, a hunter shape, a tanto shape, a cleaver shape, a hawksbill shape, or a gut shape, etc. In yet more embodiments, blade 110 has a skinner shape, a spear point shape, a caping shape, a spey shape, a coping shape, a pen knife shape, a whamcliffe shape, or a straight razor shape. In some embodiments, cutting edge 514 includes serrations 515. At least a portion of cutting edge 514 may be serrated. In some embodiments, a portion of cutting edge 514 is serrated proximate a heal of the blade.

Figures 6A, 6B, 6C:
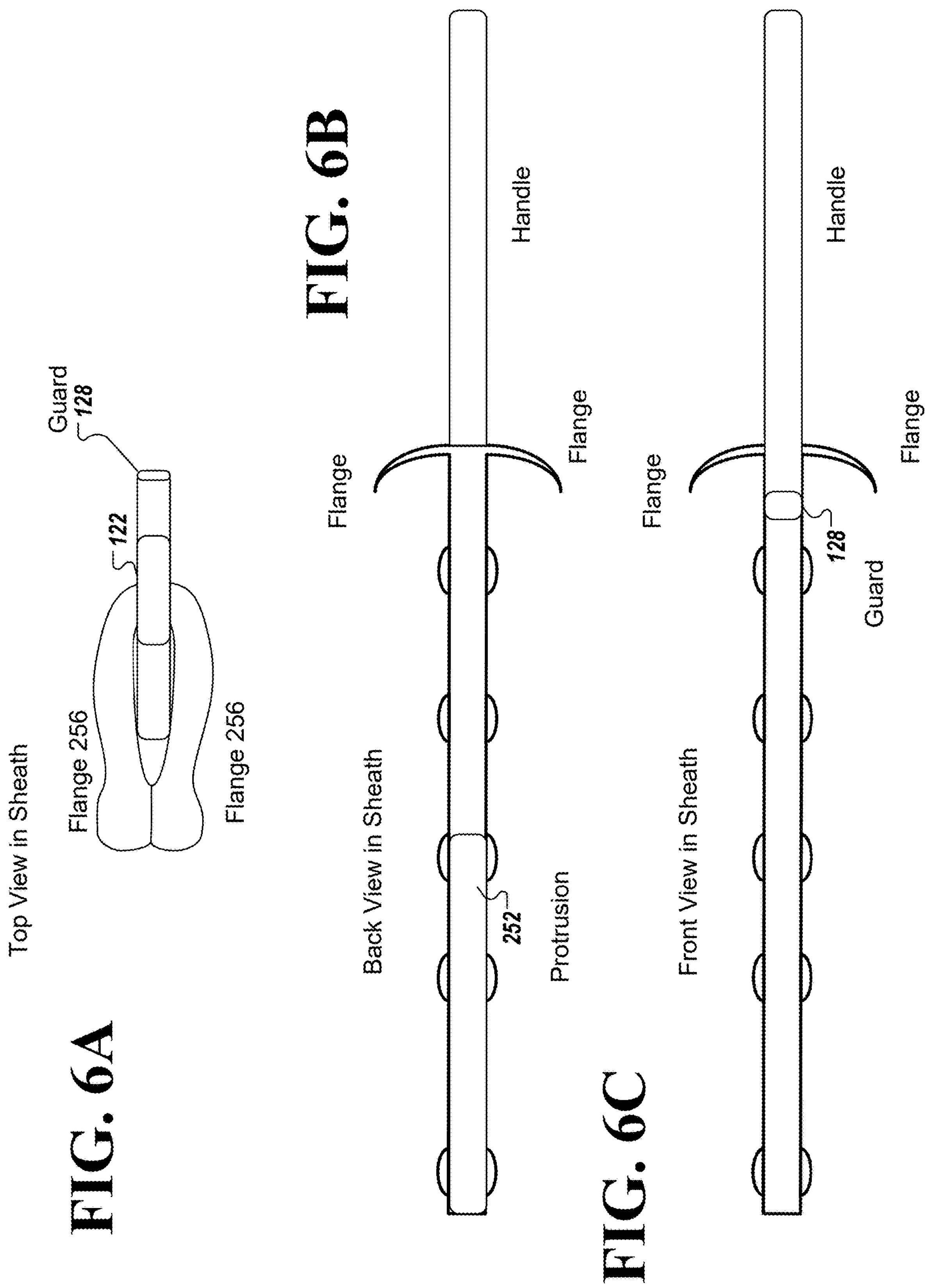
FIG. 6A illustrates a top view of a knife inserted into a sheath, according to at least one embodiment.
FIG. 6B illustrates a front view of a knife inserted into a sheath, according to at least one embodiment.
FIG. 6C illustrates a back view of a knife inserted into a sheath, according to at least one embodiment.

FIG. 6A illustrates a top view of a knife inserted into a sheath, according to at least one embodiment. FIG. 6A may show a knife inserted into a sheath from a perspective of a user looking down at the knife and sheath as if the knife and sheath were in a pants pocket. In some embodiments, at least a portion of the knife's blade is disposed within the sheath. At least a portion of the knife's handle may protrude from the sheath. In some embodiments, portions of the handle forming a substantially hooked shape protrude from the sheath. The portions forming a substantially hooked shape may be configured to hook an edge of a pocket. The portion of the handle protruding from the pocket may be towards the user's rear when the knife is carried in a pants pocket.

FIG. 6B illustrates a front view of a knife inserted into a sheath, according to at least one embodiment. FIG. 6B may show a knife inserted into a sheath. The sheath may have one or more sheath flanges disposed adjacent to a mouth of the sheath. The sheath flanges may be configured to be supported by an edge of a pocket when the knife is being inserted into the sheath.

FIG. 6C illustrates a back view of a knife inserted into a sheath, according to at least one embodiment. A portion of a knife which protrudes from the sheath and/or a pocket while the knife and sheath are carried in the pocket may be shown in FIG. 6C.

A process of removing a knife from a sheath in a pocket is described with reference to FIGS. 7-9. While carrying the knife described here, a user may draw it from the pocket and then later return it to the pocket, as illustrated in part in FIGS. 7-9.

Figure 7:
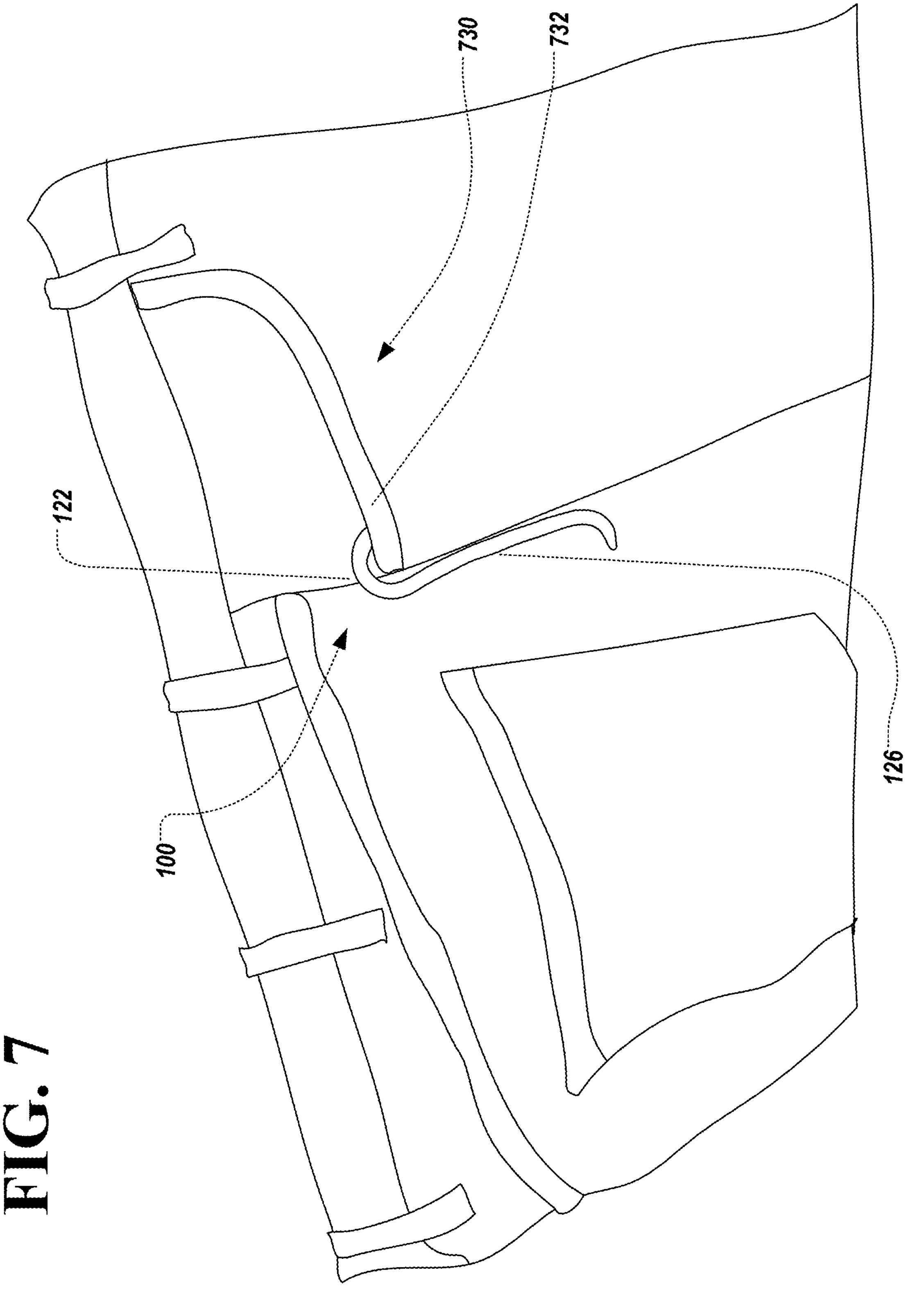
FIG. 7 is an illustration of a knife in a pocket, according to certain embodiments.

FIG. 7 is an illustration of a knife in a pocket, according to certain embodiments. In some embodiments, the knife (e.g., knife 100 of FIG. 1) can be disposed at least partially within a pocket 730. The pocket 730 may be a pocket of clothing. Specifically, the pocket may be a pants pocket, as illustrated in FIG. 7. The pocket 730 may be a jacket or coat pocket, and/or a shirt pocket, etc. However, the pocket 730 can also be a pocket of a bag, a purse, a satchel, a piece of luggage, or a backpack, etc. Additionally, the pocket 730 may be any receptacle into which the knife and its sheath may be inserted. The knife can be at least partially concealed within the pocket 730 and carried within the pocket 730 for the user's convenience. The knife may be stowed at least partially inside a sheath (e.g., sheath 250 of FIG. 2). The sheath may be disposed within the pocket 730. The pocket 730 can be a clothing pocket or another pocket, such as a bag pocket or another receptacle to receive the knife. A part of the knife's handle (e.g., butt 122 of FIG. 1) may hang from an edge (e.g., a side edge 732) of the pocket 730. In some embodiments, a portion of the knife's substantially hook shaped handle (e.g., second portion 126 of FIG. 1) is disposed outside the pocket.

To begin drawing the knife from the sheath (and the pocket 730), the user may reach for the knife's handle. The user may place their fingers on the handle. The user may grip at least a portion of the handle with the fingers, and may slide the thumb into the pocket 730. Once grasped, the user may begin to pull the knife and sheath together towards the mouth of the pocket. The sheath and the knife may together be pulled towards the mouth of the pocket by the user grasping and pulling on the knife's handle. The knife may be separated from the sheath by the user applying force, as described with reference to FIG. 9.

Figure 8:
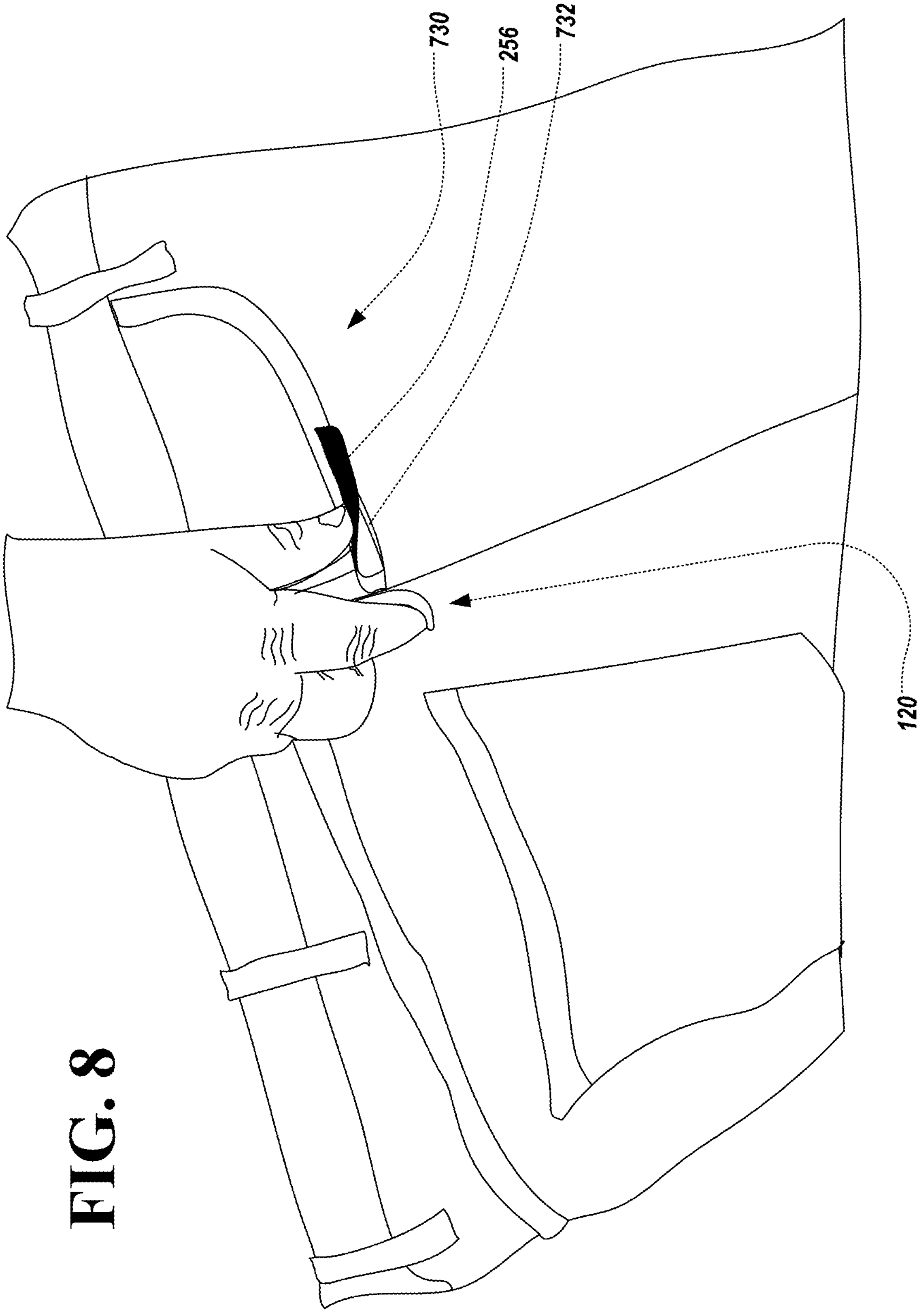
FIG. 8 is an illustration of a knife and a sheath in a pocket, according to certain embodiments.

FIG. 8 is an illustration of a knife and a sheath in a pocket, according to certain embodiments. FIG. 8 may show the knife (e.g., knife 100 of FIG. 1) being withdrawn from the pocket 730. In some embodiments, to draw the knife from the pocket, a user pulls the knife and sheath from the pocket by the knife's handle 120 until a portion of the sheath emerges from the pocket. In some embodiments, the user pulls the knife until the sheath mouth (e.g., sheath mouth 258 of FIG. 2) clears the pocket. The user may pull the knife until a sheath flange (e.g., sheath flange 256 of FIG. 3) adjacent to the sheath mouth clears the pocket. In some embodiments, once clear of the pocket, the sheath flange may then rest on an edge 732 of the pocket 730 until the knife is inserted back into the sheath.

Figure 9:
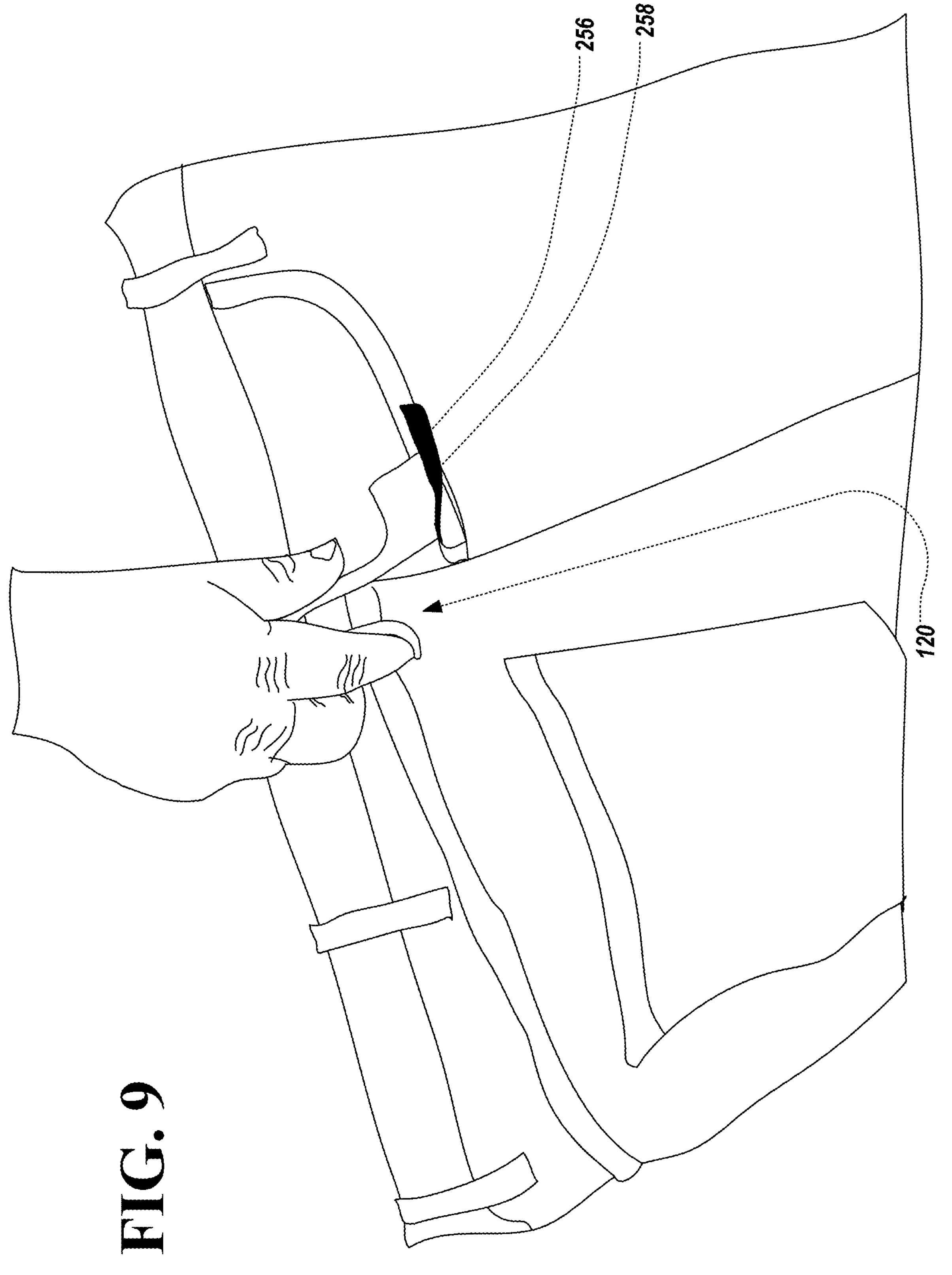
FIG. 9 is an illustration of a knife being removed from a sheath in a pocket, according to certain embodiments.

FIG. 9 is an illustration of a knife being removed from a sheath in a pocket, according to certain embodiments. In some embodiments, while drawing the knife (e.g., knife 100 of FIG. 1) from the sheath (e.g., sheath 250 of FIG. 2), the user pushes the sheath from the knife. The user may apply force against the sheath to separate the knife from the sheath. The user, using a thumb, may push against an edge of the sheath mouth 258 while pulling the knife's handle 120. In some embodiments, pushing on an edge of the sheath mouth may separate the knife from the sheath. In some embodiments, the user pushes on a sheath flange 256 adjacent to the sheath mouth 258. After pushing the sheath to separate the sheath from the knife, the user may fully withdraw the knife from the sheath. In some embodiments, a protrusion of the sheath (e.g., protrusion 252 of FIG. 2) catches on an interior surface of the pocket as the knife is withdrawn. The protrusion may catch the pocket's interior surface responsive to the knife and sheath being turned (e.g., either clockwise or counterclockwise) in the pocket. The protrusion catching an inner surface of the pocket (e.g., a pocket liner, etc.) may cause the knife to separate from the sheath as the knife is pulled by the user. The user may then withdraw the knife from the sheath. After the knife is fully withdrawn, the user may then grip the knife's handle 120 in any one or more of the grips described with reference to FIGS. 11-14. Additionally, the user may hang the knife from a finger, as described in reference to FIG. 10. While the knife is withdrawn from the sheath (e.g., while the user is using the knife), the sheath may remain in the pocket. The sheath flange 256 may rest on the edge 732 of the pocket to prevent the sheath from falling deep into the pocket. The sheath flange resting on the edge of the pocket may aid in re-sheathing the knife (e.g., inserting the knife back into the sheath), which will be described next.

To insert the knife into the sheath, the user may insert the knife's tip (e.g., the tip at the end of the cutting edge opposite the blade's heel) into the sheath mouth. One or more flanges (e.g., sheath flanges 256) adjacent to the sheath mouth may have a funnel-like shape. The one or more flanges may guide the knife's tip into the cavity of the sheath. The one or more flanges may aid in guiding the knife as the user inserts the knife into the sheath. Additionally, at least one flange may catch on the edge of the pocket (e.g., side edge 732 of pocket 730) as the knife is inserted into the sheath, preventing the sheath from being pushed into the pocket as the knife is inserted. The flange may hold the sheath from being pushed into the pocket until the knife is fully seated in the sheath. After the knife is fully seated in the sheath, the user may slightly lift the knife and sheath to clear the flange from the edge of the pocket. The user may use a finger (e.g., a forefinger) to clear the edge of the pocket from the flange as the knife and sheath are pushed into the pocket. The knife and sheath may then be pushed by the user into the pocket. As the knife and sheath are pushed into the pocket, a portion of the handle (e.g., second portion 126 of FIG. 1) may stay outside the pocket. In some embodiments, at least a portion of the handle that forms a substantially hooked shape (e.g., second portion 126, and butt 122 of FIG. 1) remains on the exterior of the pocket. An opening of the handle (e.g., an opening formed by first portion 124 and second portion 126 of FIG. 1) may receive an edge of the pocket (e.g., edge 732 of pocket 730). After pushing the knife and sheath into the pocket with the second portion 126 and a portion of butt 122 remaining exterior to the pocket, the user may withdraw their hand, leaving the knife and sheath in the pocket. The knife may hang from the edge of the pocket by an inner radius of a curved portion of the knife forming the knife's butt (e.g., an inner radius of knife butt 122 of FIG. 1).

Figure 10A:
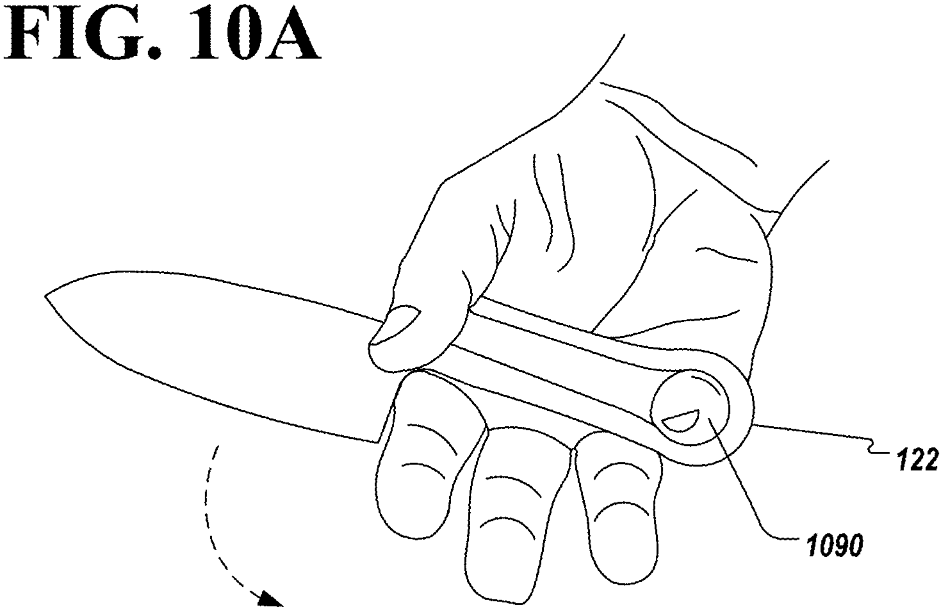
FIGS. 10A-B illustrate a knife with a finger of a user's hand inserted through an inner radius of the knife's handle, according to certain embodiments.
Figure 10B:
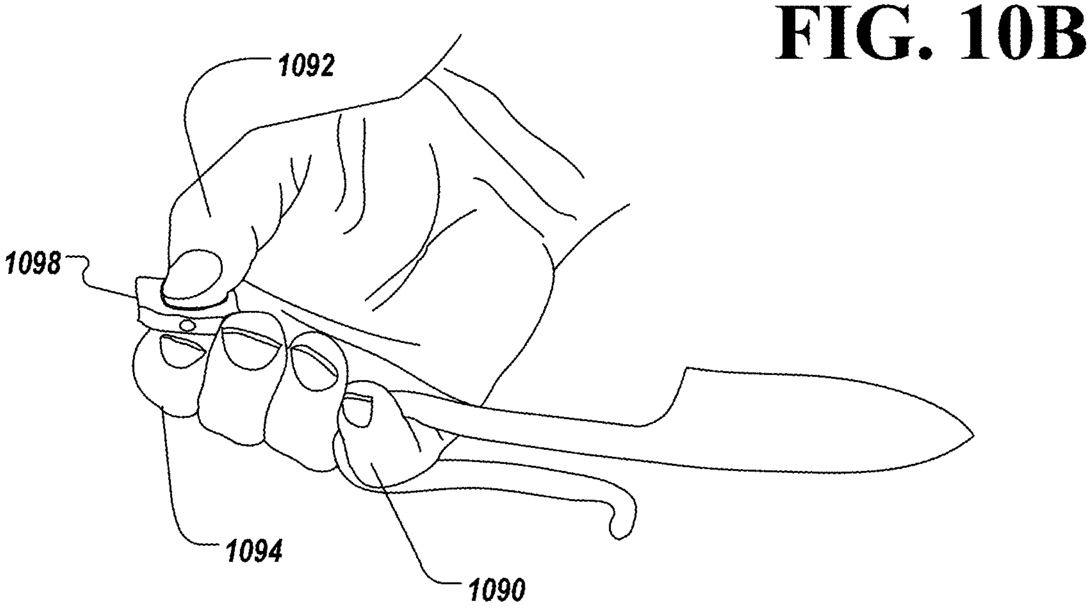

FIGS. 10A-B illustrate a knife with a finger of a user's hand inserted through an inner radius of the knife's handle, according to certain embodiments. The knife (e.g., knife 100 of FIG. 1) may be configured so that the knife can be hung by a user's finger. A user may at times desire to temporarily disuse the knife without setting the knife down. This can be facilitated by hanging the knife from a finger. Additionally, the user may exercise at least some control over the knife using the finger upon which the knife is hung and one or more adjacent fingers (e.g., one or more knuckles of the adjacent fingers).

Referring to FIG. 10A, in some embodiments, to hang the knife from a finger, the user inserts the chosen finger 1090 (e.g., a pinky finger, fifth finger, etc.) through an inner radius of the knife's butt (e.g., knife butt 122 of FIG. 1, an end of the handle, etc.). In some embodiments, the user may position their hand and fingers from a traditional grip (e.g., a natural grip) to slide their finger 1090 through an opening of the handle (e.g., an inner radius of knife butt 122). The user may relax their grip on the handle, allowing the handle to rotate out of their hand, pivoting on the finger inserted through the inner radius of the knife butt. The user relaxing their grip on the handle may allow the knife to swing by its own weight out of the hand, the fulcrum of the knife's swinging motion being the finger 1090 upon which the knife is hung. The knife may hang from the user's finger 1090. The knife may hang under its own weight. The user may control the hanging knife by opening or closing their grip, or by pushing on the knife's butt with one or more adjacent fingers (e.g., knuckles of one or more adjacent fingers). Referring to FIG. 10B, with the knife hanging from the user's finger 1090, the user may use their remaining fingers (e.g., the user's other fingers) to grip or manipulate objects other than the knife. For example, while the knife is suspended from the user's pinky finger, the user may use the thumb 1092 and forefinger 1094 to grasp an object 1098, as shown in FIG. 10B. As another example, with the knife hanging from a pinky finger, the user may manipulate the carcass of an animal that the user is skinning or quartering, etc. using the other fingers of the same hand. By hanging the knife from a finger 1090, the user need not set the knife down to accomplish another task. The user may be able to safely hold the knife while using their fingers or hand. Hanging the knife on a finger 1090 may lead to the knife not being misplaced, the knife not falling, the knife not being contaminated with dirt or debris on the ground, or a non-occurrence of an accidental cut while the knife is set down.

The knife of the present disclosure may have features allowing it to be gripped in a number of common cutting grips. Features of the knife of the present disclosure (e.g., handle 120, first portion 124, second portion 126, butt 122, guard 128, spine 112, etc. of FIG. 1) may not preclude a user to use one or more common cutting grips. Features of the knife of the present disclosure may allow the knife to be comfortably used in any of the grips described in reference to FIGS. 11-14.

FIGS. 11A-B illustrate a user's hand gripping a knife in a natural grip, according to certain embodiments. Referring to FIG. 11A, a user may grip the knife's handle using substantially all the user's fingers of a hand. The user may place a thumb 1092 on the side of the handle (e.g., handle 120 of FIG. 1) to give support. Referring to FIG. 11B, the user may place the thumb 1092 on the knife's spine (e.g., spine 112 of FIG. 1) to provide control of the knife during a cutting operation.

Figure 12A:
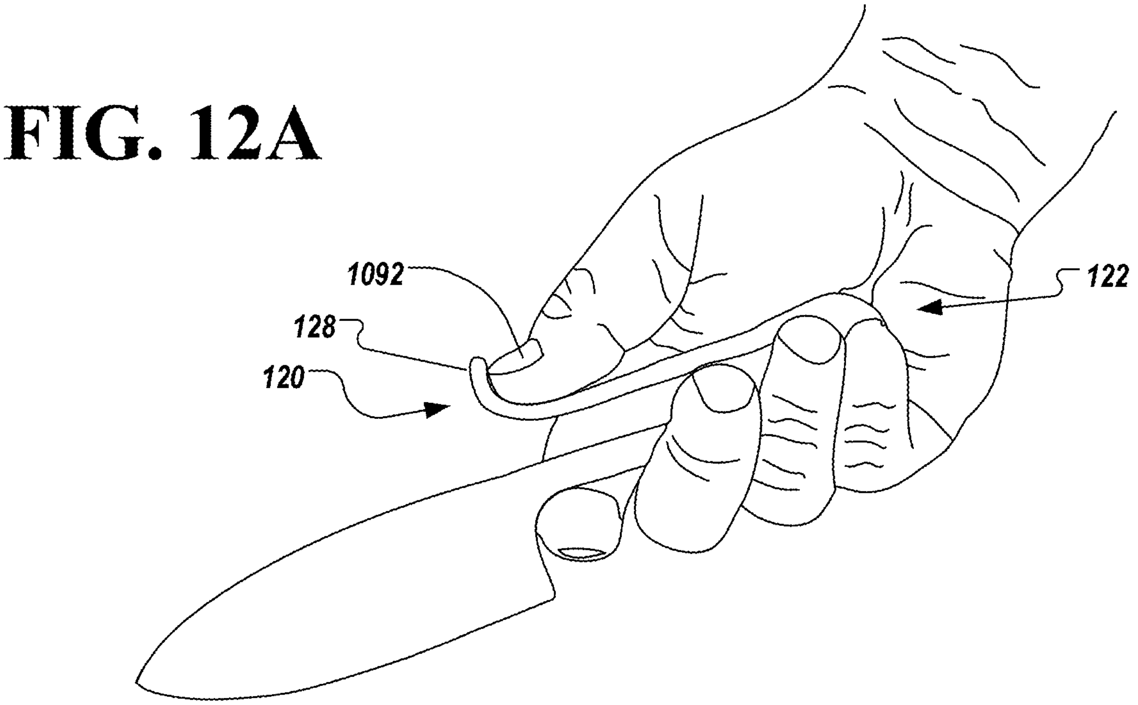
FIG. 12A is an illustration of a user's hand gripping a knife with a thumb on top of the knife's handle, according to certain embodiments.

FIG. 12A is an illustration of a user's hand gripping a knife with a thumb on top of the knife's handle, according to certain embodiments. The user may place their thumb 1092 on the knife's handle (e.g., handle 120 of FIG. 1), with the knife's butt (e.g., butt 122 of FIG. 1) against a heel of the user's hand. The user's thumb may be placed adjacent a handle guard structure (e.g., guard 128 of FIG. 1).

Figure 12B:
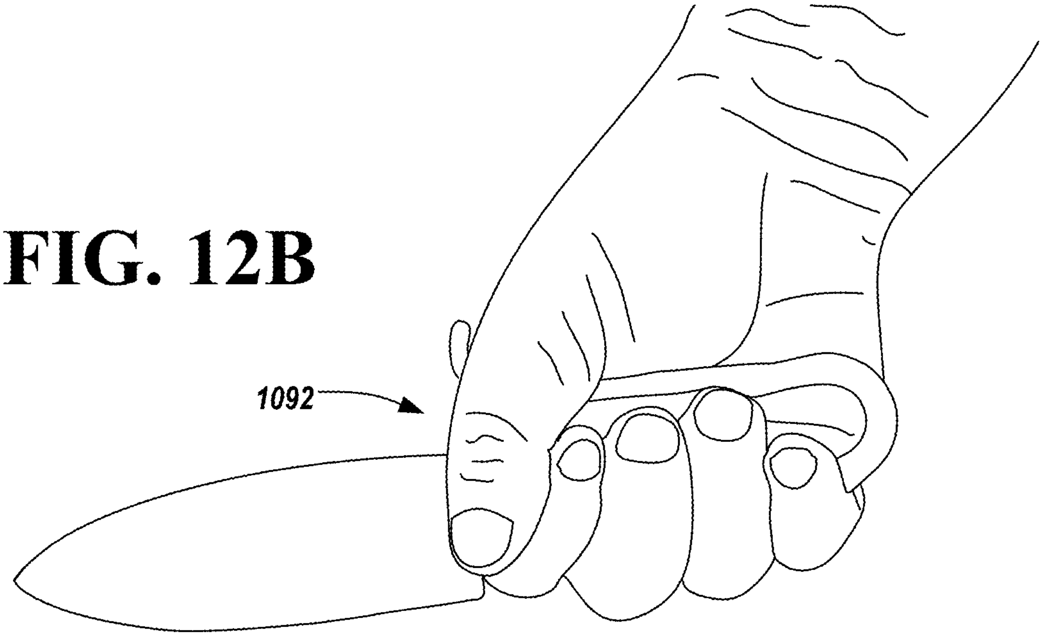
FIG. 12B is an illustration of a user's hand gripping a knife in a hammer grip, according to certain embodiments.

FIG. 12B is an illustration of a user's hand gripping a knife in a hammer grip, according to certain embodiments. The user may tightly grip the knife's handle using all five fingers, the user's thumb 1092 wrapped around the handle and overlapping the forefinger.

Figure 13A:
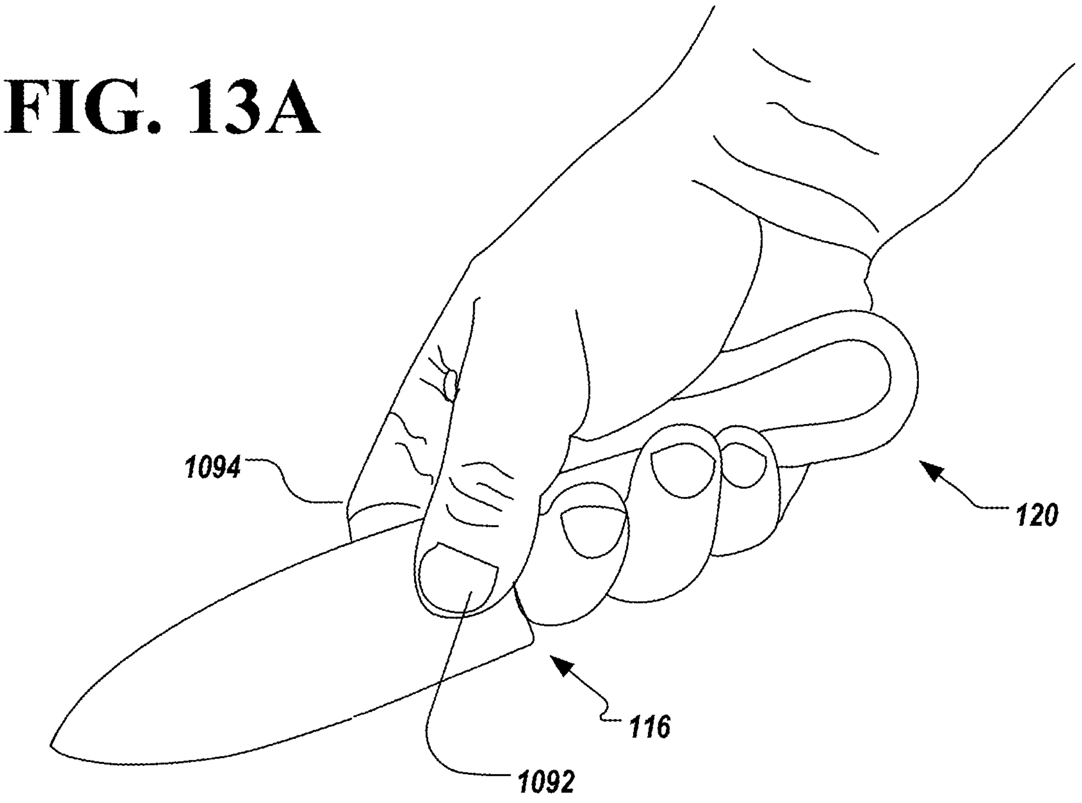
FIG. 13A is an illustration of a user's hand gripping a knife in a pinch grip, according to certain embodiments.

FIG. 13A is an illustration of a user's hand gripping a knife in a pinch grip, according to certain embodiments. The user may grip the knife (e.g., knife 100 of FIG. 1) substantially by the knife's bolster (e.g., bolster 116 of FIG. 1). The user may pinch a heel of the blade between the thumb 1092 and forefinger 1094. The remainder of the user's fingers may wrap around the knife's handle (e.g., handle 120 of FIG. 1).

Figure 13B:
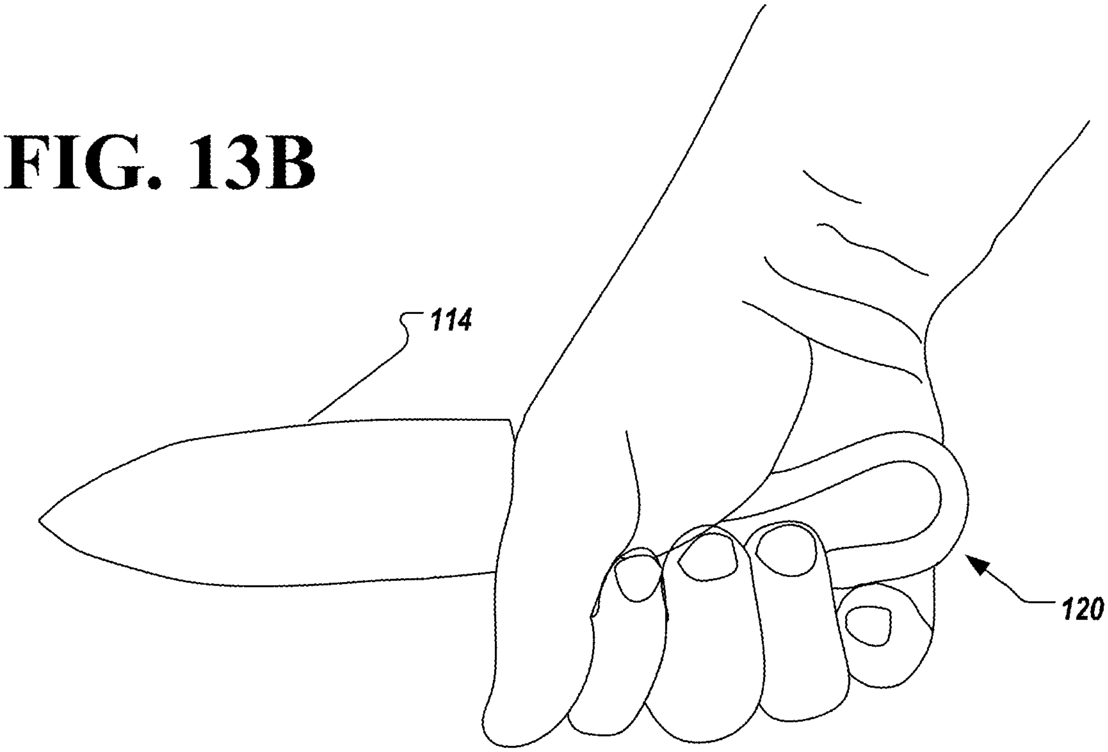
FIG. 13B is an illustration of a user's hand gripping a knife in a pull-cut grip, according to certain embodiments.

FIG. 13B is an illustration of a user's hand gripping a knife in a pull-cut grip, according to certain embodiments. The user may firmly grasp the knife's handle (e.g., handle 120 of FIG. 1) using all five fingers, substantially similar to the hammer grip referred to in FIG. 12B. The user may grip the knife such that the cutting edge (e.g., cutting edge 114 of FIG. 1) points toward the user's forearm (e.g., towards the user instead of away as is conventionally done to grip a knife).

Figure 14:
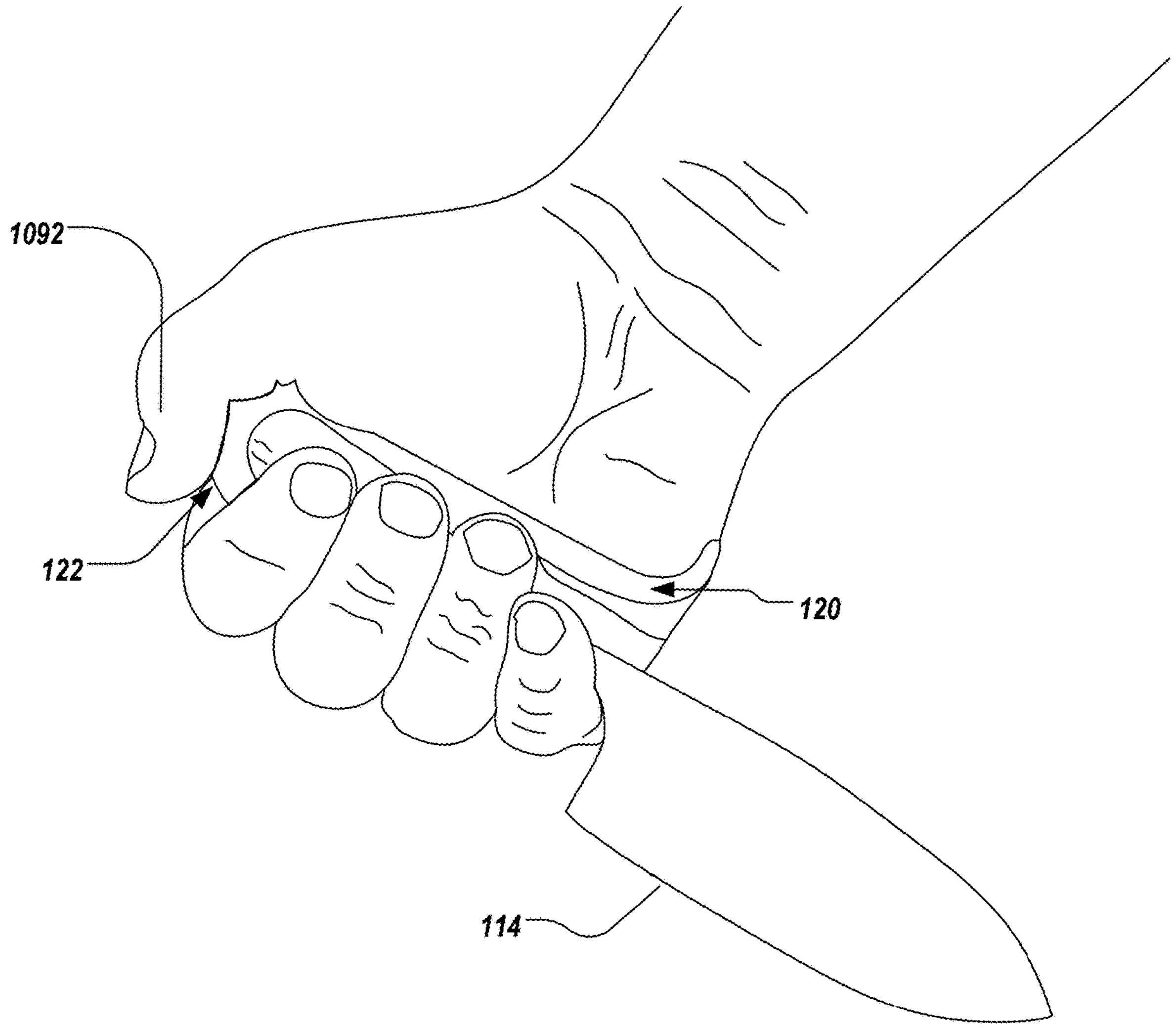
FIG. 14 is an illustration of a user's hand gripping a knife in an ice pick grip, according to certain embodiments.

FIG. 14 is an illustration of a user's hand gripping a knife in an ice pick grip, according to certain embodiments. The user may grip the knife's handle (e.g., handle 120 of FIG. 1) by wrapping four fingers around the handle, with the thumb 1092 placed firmly on the knife's butt (e.g., knife butt 122 of FIG. 1). The knife may be held with the cutting edge (e.g., cutting edge 114 of FIG. 1) pointed away from the user.

Figure 15A:
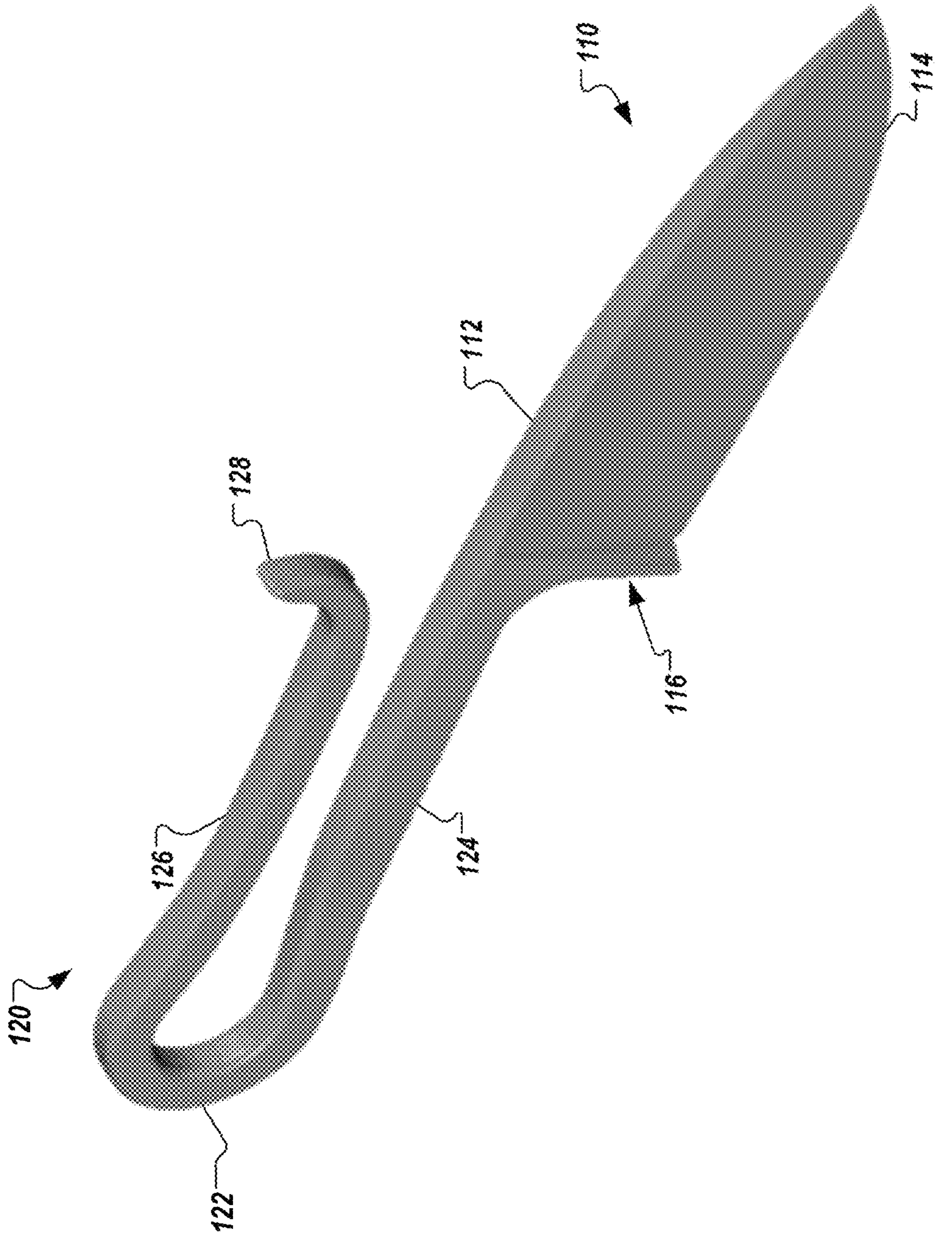
FIGS. 15A-C each illustrate a knife, according to some embodiments described herein.
Figure 15B:
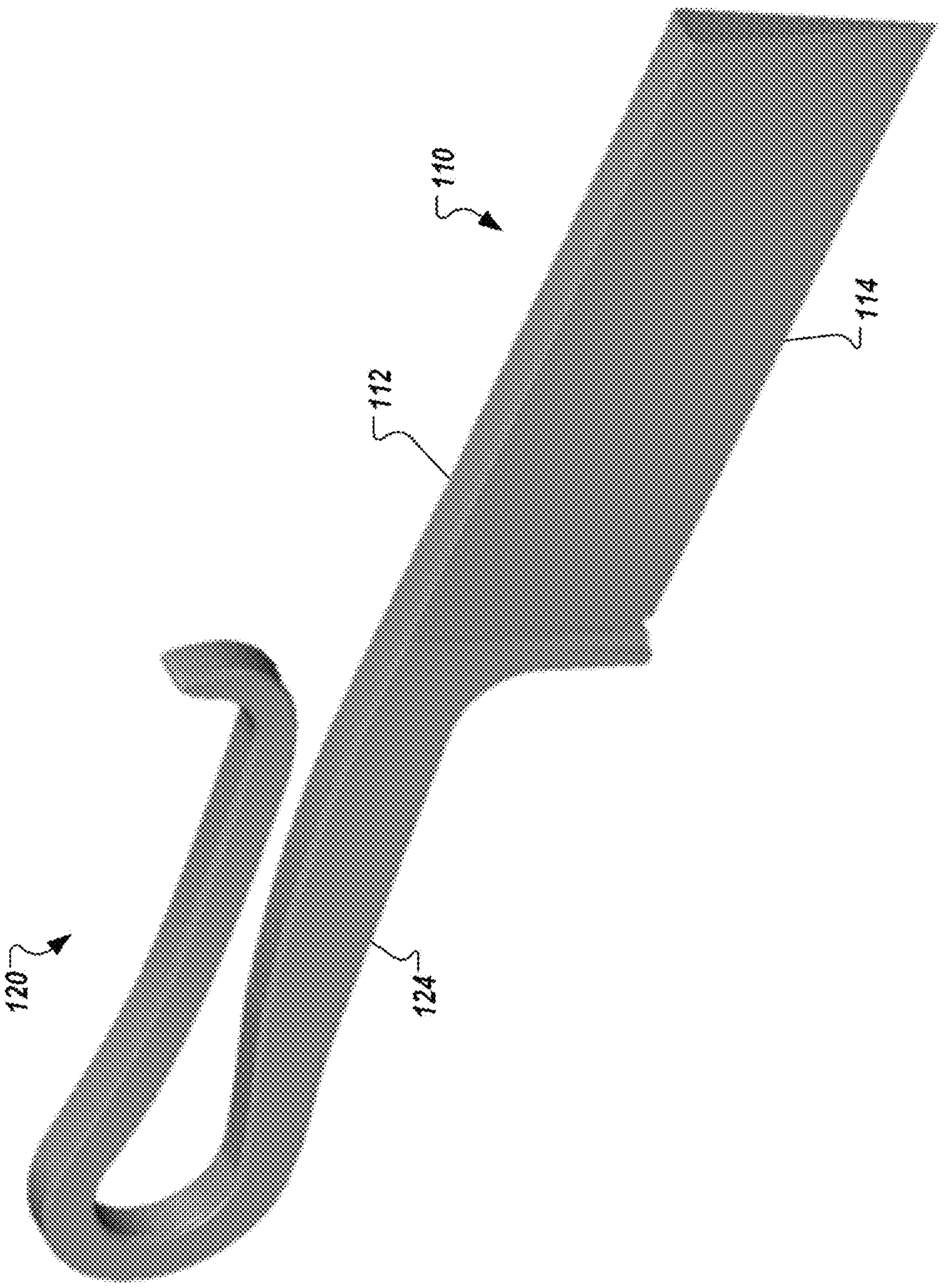
Figure 15C:
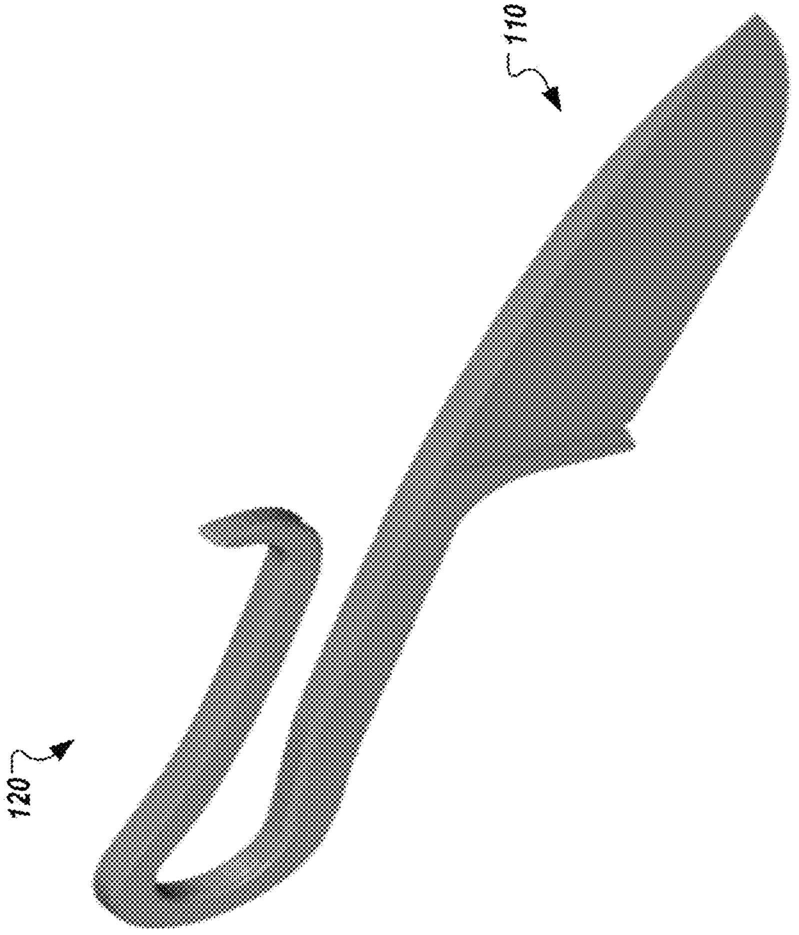

FIGS. 15A-C each illustrate a knife, according to some embodiments described herein. Referring to FIG. 15A, a knife includes a blade 110, and a handle 120. The knife may also include a bolster 116 between the blade 110 and the handle 120. The length of the blade 110 may be substantially similar to the length of handle 120. In some embodiments, blade 110 and handle 120 are both approximately four inches long. However, depending upon the knife's intended use (e.g., skinning, chopping, general purpose, etc.), blade 110 and handle 120 may each be shorter or longer than four inches. Blade 110 may have a drop point shape. Blade 110 includes a cutting edge 114 and a spine 112 opposite cutting edge 114. Handle 120 may include first portion 124, second portion 126, and butt 122. Handle 120 may further include curved guard 128. An opening may be formed between first portion 124 and second portion 126. The opening may be configured to accept a side edge of a pocket to allow the knife to hang from the side edge of the pocket. An inner radius of butt 122 may be enlarged relative to the opening between first portion 124 and second portion 126. The inner radius of butt 122 may be configured for a user's finger (e.g., a user's pinky finger) to be inserted through. First portion 124 and second portion 126 may be curved to fit the grasp of a user's hand.

Referring to FIG. 15B, a knife includes a blade 110. Blade 110 may have a rectangular shape. In some embodiments, blade 110 has a cleaver shape. In other embodiments, blade 110 has a straight razor shape. The cutting edge 114 may be substantially straight. Spine 112 may be substantially parallel to cutting edge 114. In some embodiments, first portion 124 may have a non-uniform thickness along its length.

Referring to FIG. 15C, a knife includes blade 110 and handle 120. In some embodiments, blade 110 is shorter than handle 120. In some embodiments, blade 110 may have a length of approximately two inches or less. In some embodiments, handle 120 may have a length of approximately four inches. Blade 110 may have a length that complies with local laws against carrying knives with blades longer than a specified length (e.g., longer than two inches).

The above description of illustrated implementations of the disclosure, including what is described in the Abstract, is not intended to be exhaustive or limit the disclosure to the precise forms disclosed. While specific implementations of, and examples for, the disclosure are described herein for illustrative purposes, various equivalent modifications are possible within the scope of the disclosure, as those skilled in the relevant art will recognize.

The terms “over,” “under,” “between,” “side,” “further,” “disposed on,” and “on” as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

Various embodiments can have different combinations of the structural features described above. For instance, all optional features of a device or system described herein can also be implemented in a device or system, and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of material, specific sizes, specific surfaces, specific structures, specific details, specific configurations, specific types, specific system components, specific operations, etc. in order to provide a thorough understanding of the present disclosure. It will be apparent, however, to one skilled in the art that these specific details need not be employed to practice the present disclosure. In other instances, other components or methods, such as specific and alternative material, sizes, surfaces, structures, details, configurations, types, system components, operations, etc. have not been described in detail in order to avoid unnecessarily obscuring the present disclosure.

Although some of the embodiments herein are described with reference to specific devices or systems, other embodiments are applicable to other types of structures and surfaces. Similar techniques and teachings of embodiments of the present disclosure can be applied to other types of structures and surfaces that can benefit from the advantages described herein. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Use of the phrase ‘configured to,’ in one embodiment, refers to arranging, putting together, manufacturing, offering to sell, importing and/or designing an apparatus, hardware, logic, or element to perform a designated or determined task. In this example, an apparatus or element thereof that is not operating is still ‘configured to’ perform a designated task if it is designed, coupled, and/or interconnected to perform said designated task.

Furthermore, the use of the phrases ‘to,’ ‘capable of/to,’ and or ‘operable to,’ in one embodiment, refers to some apparatus, hardware, and/or element designed in such a way to enable the use of the apparatus, hardware, and/or element in a specified manner. Note that use of to, capable to, or operable to, in one embodiment, refers to the latent state of an apparatus, hardware, and/or element, where the apparatus, hardware, and/or element is not operating but is designed in such a manner to enable the use of an apparatus in a specified manner.

Reference throughout this specification to “one embodiment,” “an embodiment,” or “some embodiments” means that a particular feature, structure, or characteristic described in connection with the embodiment is included in at least one embodiment of the present disclosure. Thus, the appearances of the phrases “in one embodiment,” “in an embodiment,” and “in some embodiments” in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but can refer to different and distinct embodiments, as well as potentially the same embodiment.

The words “example” or “exemplary” are used herein to mean serving as an example, instance or illustration. Any aspect or design described herein as “example” or “exemplary” is not necessarily to be construed as preferred or advantageous over other aspects or designs. Rather, the use of the words “example” or “exemplary” is intended to present concepts in a concrete fashion. As used in this application, the term “or” is intended to mean an inclusive “or” rather than an exclusive “or.” That is, unless specified otherwise, or clear from context, “X includes A or B” is intended to mean any of the natural inclusive permutations. That is, if X includes A; X includes B; or X includes both A and B, then “X includes A or B” is satisfied under any of the foregoing instances. In addition, the articles “a” and “an” as used in this application and the appended claims should generally be construed to mean “one or more” unless specified otherwise or clear from context to be directed to a singular form. Moreover, use of the term “an embodiment” or “one embodiment” or “an implementation” or “one implementation” throughout is not intended to mean the same embodiment or implementation unless described as such. Also, the terms “first,” “second,” “third,” “fourth,” etc. as used herein are meant as labels to distinguish among different elements and can not necessarily have an ordinal meaning according to their numerical designation.

What is claimed is:

1. A knife comprising:

a blade having a cutting edge and a spine opposite the cutting edge;

a bolster adjacent to the blade and defining a lateral axis; and a handle, wherein the handle comprises:

a first portion extending along a first longitudinal axis from a first end coupled to the bolster to a second end;

a second portion extending along a second longitudinal axis substantially parallel with the first longitudinal axis towards the lateral axis defined by the bolster from the second end to a third end, wherein the second longitudinal axis intersects the lateral axis on a side of the first longitudinal axis laterally opposite relative to the cutting edge; and a curved portion forming a butt of the knife at a proximal end of the handle opposite a tip of the blade, wherein the curved portion couples the first portion and the second portion, and wherein the first portion and the second portion form an opening between the first portion and the second portion and substantially parallel with the spine, the opening having a mouth disposed between the first longitudinal axis and the second longitudinal axis.

2. The knife of claim 1, wherein the first portion, the second portion, and the curved portion of the handle form a substantially hooked shape.

3. The knife of claim 1 wherein the blade and handle are made from a single piece of material, a tang of the knife forming the handle.

4. The knife of claim 1, wherein the third end of the handle comprises a curved guard, the curved guard curving in a first direction away from the spine.

5. The knife of claim 1, wherein the first portion and the second portion have substantially similar lengths.

6. The knife of claim 1, wherein the curved portion of the handle curves in a first direction away from the cutting edge of the blade such that the second portion of the handle is located on a side of the first portion opposite the cutting edge and such that the second portion of the handle is further from the cutting edge than the first portion.

7. The knife of claim 1, wherein an inner radius of the curved portion of the handle is configured to accept a finger of a user's hand such that the knife can be hung by the curved portion on the finger.

8. A cutting system comprising:

a knife comprising:

a blade;

a bolster adjacent to the blade and defining a lateral axis; and a handle, wherein the handle comprises:

a first portion extending along a first longitudinal axis from a first end coupled to the bolster to a second end;

a second portion extending along a second longitudinal axis substantially parallel with the first longitudinal axis from the second end towards the lateral axis defined by the bolster to a third end, wherein the second longitudinal axis intersects the lateral axis on a side of the first longitudinal axis laterally opposite relative to a cutting edge of the blade; and a curved portion forming a butt of the knife at a proximal end of the handle opposite a tip of the blade, wherein the curved portion couples the first portion and the second portion, and wherein the first portion and the second portion form an opening between the first portion and the second portion and substantially parallel with the first longitudinal axis, the opening having a mouth disposed between the first longitudinal axis and the second longitudinal axis; and a sheath configured to hold the knife, the sheath comprising a cavity to receive the blade of the knife, a body of the sheath having a first end and a second end, the body forming an opening at the first end for the blade to enter the cavity.

9. The cutting system of claim 8, wherein the first portion, the second portion, and the curved portion of the handle form a substantially hooked shape.

10. The cutting system of claim 8, wherein the blade and handle are made from a single piece of material, a tang of the knife forming the handle.

11. The cutting system of claim 8, wherein the third end of the handle comprises a curved guard, wherein the curved guard is curved away from a spine of the blade.

12. The cutting system of claim 8, wherein the first portion and the second portion have substantially similar lengths.

13. The cutting system of claim 8, wherein the curved portion of the handle curves in a first direction away from a cutting edge of the blade such that the second portion of the handle is located on a side of the first portion opposite the cutting edge and such that the second portion of the handle is further from the cutting edge than the first portion.

14. The cutting system of claim 8, wherein an inner radius of the curved portion of the handle is configured to accept a finger of a user's hand such that the knife can be hung by the curved portion on the finger.

15. The cutting system of claim 8, wherein the body of the sheath further comprises a protrusion at the second end, the protrusion to secure the sheath in a pocket when the knife is withdrawn from the sheath.

16. The cutting system of claim 8, wherein the opening of the sheath comprises one or more flanges on one or more sides of the opening, the one or more flanges to aid in guiding the blade of the knife into the cavity as the knife is inserted into the sheath, and to catch an edge of a pocket while the knife is inserted into the sheath, wherein the edge of the pocket is to support the sheath while the knife is inserted into the sheath.

17. The cutting system of claim 8, wherein the sheath comprises a thermoplastic material.

18. A cutting apparatus, comprising:

a blade;

a bolster defining a lateral axis; and a handle comprising an extension that extends along a first longitudinal axis from a first end of the handle towards a second end proximate to the bolster on a same side as a spine of the blade, the spine defining a second longitudinal axis substantially parallel with the first longitudinal axis, wherein the first longitudinal axis intersects the lateral axis on a side of the second longitudinal axis laterally opposite relative to a cutting edge of the blade, the handle and the extension coupled by an end portion forming a butt of the cutting apparatus at the first end opposite the blade, the handle and the extension forming an opening between the extension and the handle at the second end, the opening having a mouth disposed between the first longitudinal axis and the second longitudinal axis.

19. The cutting apparatus of claim 18, wherein the handle comprises:

a first portion coupled to the spine;

a second portion; and a curved portion coupling the first portion and the second portion and forming the end portion, wherein the first portion and the second portion form an opening between the first portion and the second portion, the opening configured to allow the cutting apparatus to hang from a side edge of a pocket when the cutting apparatus is carried within the pocket.

20. The cutting apparatus of claim 19, wherein the first portion, the second portion, and the curved portion of the handle form a substantially hooked shape.

* * * * *